US012671098B2

(12) United States Patent
Aono et al.

(10) Patent No.: US 12,671,098 B2
(45) Date of Patent: Jun. 30, 2026

(54) SEPARATOR FOR FUEL CELL

(71) Applicant: TOYOTA BOSHOKU KABUSHIKI KAISHA, Aichi-ken (JP)

(72) Inventors: Haruyuki Aono, Aichi-ken (JP); Satoshi Kawabe, Ichinomiya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 932 days.

(21) Appl. No.: 17/751,244

(22) Filed: May 23, 2022

(65) Prior Publication Data

US 2022/0384819 A1    Dec. 1, 2022

(30) Foreign Application Priority Data

| | | | |
|---|---|---|---|
| May 27, 2021 | (JP) | ................................. | 2021-089377 |
| May 27, 2021 | (JP) | ................................. | 2021-089378 |
| May 27, 2021 | (JP) | ................................. | 2021-089379 |
| May 27, 2021 | (JP) | ................................. | 2021-089380 |
| May 27, 2021 | (JP) | ................................. | 2021-089381 |

(51) Int. Cl.
*H01M 8/026* (2016.01)
*H01M 8/0263* (2016.01)
*H01M 8/0267* (2016.01)

(52) U.S. Cl.
CPC ......... *H01M 8/026* (2013.01); *H01M 8/0263* (2013.01); *H01M 8/0267* (2013.01)

(58) Field of Classification Search
CPC ... H01M 8/026; H01M 8/0263; H01M 8/0267
See application file for complete search history.

(56) References Cited

U.S. PATENT DOCUMENTS 6,420,061 B1 * 7/2002 Fujii ..................... H01M 8/242
429/452
2007/0117004 A1    5/2007 Kikuchi et al.
(Continued)

FOREIGN PATENT DOCUMENTS

| CN | 101267042 | 9/2008 |
|---|---|---|
| CN | 107579263 | 1/2018 |

(Continued)

OTHER PUBLICATIONS

Japan, Notice of Reasons for Refusal received in JP Application No. 2021-089377, dated Jun. 11, 2024.
(Continued)

*Primary Examiner* — Allison Bourke
*Assistant Examiner* — Travis L. Martin
(74) *Attorney, Agent, or Firm* — GREENBLUM & BERNSTEIN, P.L.C.

(57) ABSTRACT

A separator for a fuel cell includes a contact surface configured to contact a power generating unit of the fuel cell. Groove passages are arranged side by side in the contact surface. Reactant gas flows through the groove passages. At least one of the groove passages includes a wavy section that extends in a wavy shape in planar directions of the contact surface. An upstream portion and a downstream portion in a flow direction of the reactant gas in each groove passage are defined as an upstream portion and a downstream portion, respectively. A wavelength of the wavy section is smaller in the downstream portion than in the upstream portion.

18 Claims, 21 Drawing Sheets

(56)           References Cited

U.S. PATENT DOCUMENTS

| | | | |
|---|---|---|---|
| 2008/0226967 A1 | 9/2008 | Tighe et al. | |
| 2009/0291349 A1* | 11/2009 | Na | H01M 8/0263 |
| | | | 429/437 |
| 2013/0337359 A1 | 12/2013 | Sugura et al. | |
| 2014/0178789 A1 | 6/2014 | Suzuki et al. | |
| 2018/0131013 A1 | 5/2018 | Nonoyama et al. | |
| 2019/0214654 A1* | 7/2019 | Nishida | H01M 8/1004 |
| 2019/0305327 A1* | 10/2019 | Okabe | H01M 8/0263 |
| 2020/0259188 A1* | 8/2020 | Leger | H01M 8/1011 |
| 2021/0242472 A1* | 8/2021 | Yanai | H01M 8/0243 |

FOREIGN PATENT DOCUMENTS

| | | |
|---|---|---|
| CN | 211480191 | 9/2020 |
| JP | 2007-141552 | 6/2007 |
| JP | 2008-226838 | 9/2008 |
| JP | 2014-127261 | 7/2014 |
| JP | 2018-78020 | 5/2018 |
| JP | 2020-9546 | 1/2020 |
| WO | 2014/026288 | 2/2014 |

OTHER PUBLICATIONS

China, Office Action received in CN Application No. 202210571108. 0, dated Aug. 14, 2024.

Japan, Notice of Reasons of Refusal received in JP Application No. 2021-089381, dated May 21, 2024.

Japan, Notice of Reasons for refusal received in JP Appl. No. 2024-144195, dated Jul. 15, 2025, and English language translation thereof.

* cited by examiner

Upstream Side ←——→ Downstream Side 241 (291)  248  240B  240  245 (295)

244 (294)

246 (296)

243 (293)

247  240A  242 (292)

224 (294)  221 (291)  212 (211A) 210  220  225 (295)

227

226 (296)

223 (293)

212 (211B)  222 (292)

231 (291)  237  230A  230  235 (295)

234 (294)

236 (296)

233 (293)

238  230B  232 (292)

272

L 237a (237)

Z

Upstream Side ← → Y Downstream Side

L 237a (237)

Z

Upstream Side ← → Y Downstream Side 441 (491)  448  440B  440  445 (495)

444 (494)

446 (496)

447  440A  443 (493)

442 (492)

424 (494)  421 (491)  412 (411A) 410  420  425 (495)

426 (496)  427

412 (411B)  423 (493)

422 (492)

431 (491)  430

434 (494)  437  430A  435 (495)

436 (496)

433 (493)

438  430B  432 (492)

544 (594)
541 (591)
548
540B
540
545 (595)

546 (596)

543 (593)

542 (592)

547
540A 524 (594)
521 (591)
512 (511A) 510
520
525 (595)

526 (596)
527

523 (593)

512 (511B)
522 (592)

534 (594)
531 (591)
537
530A
530
535 (595)

536 (596)

533 (593)

532 (592)

538
530B

SEPARATOR FOR FUEL CELL

BACKGROUND

1. Field

The present disclosure relates to a separator for a fuel cell.

2. Description of Related Art

Japanese Laid-Open Patent Publication No. 2018-78020 discloses a single cell used in a fuel cell stack. The single cell includes a membrane electrode assembly (hereinafter, referred to as MEA), a first separator, and a second separator. The first and second separators hold the MEA between them.

The MEA includes a catalyst coated membrane (hereinafter, referred to as CCM) and gas diffusion layers (hereinafter, referred to as GDL). The CCM includes an electrolyte membrane and a catalyst layer. The gas diffusion layers are respectively provided on opposite sides of the CCM.

The first separator includes first groove passages for oxidation gas and cooling groove passages for cooling medium. The first groove passages each extend in a straight line and are formed in a surface of the first separator that faces the MEA. The shapes of protrusions and recesses of the first groove passages on one side of the first separator and the shapes of recesses and protrusions of the cooling groove passages on the opposite side of the first separator conform to each other.

The second separator includes second groove passages for fuel gas and cooling groove passages for cooling medium. The second groove passages each have a wavy shape and are formed in a surface of the second separator that faces the MEA. The shapes of protrusions and recesses of the second groove passages on one side of the second separator and the shapes of recesses and protrusions of the cooling groove passages on the opposite side of the second separator conform to each other. The amplitude of each second groove passage is set such that the second groove passage overlaps with protrusions on the back side of first groove passages in the first separator, which faces the second separator.

When such single cells are stacked, the protrusions of the second groove passages in one of the single cells and the protrusions of the back side of the first groove passage in another cell are in contact with each other over a relatively large area. This improves the stability of the contacting structure of the adjacent separators and thus improves the stability of the contacting structure of the single cells.

This type of single cell allows fuel gas to gradually permeate into the GDL adjacent to the second separator while flowing through the second groove passages of the second separator. Such permeation of the fuel gas into the GDL generates power.

In the above-described single cell, generation of power gradually consumes the fuel gas as the fuel gas flows through the second groove passages from an upstream portion toward a downstream portion. This reduces the flow rate of fuel gas in downstream portions of the groove passages. Accordingly, the amount of fuel gas that permeates into the GDL readily decreases. As a result, power generation may drop in the downstream portions of the groove passages.

Also, it is desired that, in such a single cell, fuel gas permeate into a wider area of the GDL in order to increase power generation efficiency.

Such objectives are not unique to separators having groove passages for fuel gas, but also apply to separators having groove passages for oxidation gas.

SUMMARY

Accordingly, it is a first objective of the present disclosure to provide a separator for a fuel cell that limits reduction in the amount of reactant gas that permeates into a gas diffusion layer in a downstream portion of a groove passage.

Also, it is a second objective of the present disclosure to provide a separator for a fuel cell that allows reactant gas to permeate into a wide area in a gas diffusion layer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To achieve a first objective, a separator for a fuel cell in a first aspect includes a contact surface configured to contact a power generating unit of the fuel cell, and groove passages arranged side by side in the contact surface. Reactant gas flows through the groove passages. At least one of the groove passages includes a wavy section that extends in a wavy shape in planar directions of the contact surface. An upstream portion and a downstream portion in a flow direction of the reactant gas in each groove passage are defined as an upstream portion and a downstream portion, respectively. A wavelength of the wavy section is smaller in the downstream portion than in the upstream portion.

To achieve the first objective, a separator for a fuel cell in a second aspect includes a contact surface configured to contact a power generating unit of the fuel cell, and groove passages arranged side by side in the contact surface. Reactant gas flows through the groove passages. At least one of the groove passages includes a wavy section that extends in a wavy shape in planar directions of the contact surface. An upstream portion and a downstream portion in a flow direction of the reactant gas in each groove passage are defined as an upstream portion and a downstream portion, respectively. An amplitude of the wavy section is larger in the downstream portion than in the upstream portion.

To achieve the second objective, a separator for a fuel cell in a first aspect includes a contact surface configured to contact a power generating unit of the fuel cell, and groove passages arranged side by side in the contact surface. Reactant gas flows through the groove passages. A direction in which the groove passages are arranged side by side is defined as an arrangement direction. The groove passages include a first groove passage and a second groove passage that extend in wavy shapes in planar directions of the contact surface and are adjacent to each other in the arrangement direction. At least one of the first groove passage and the second groove passage includes branched passages that are arranged side by side in the arrangement direction. A number of passages arranged side by side in the arrangement direction in the first groove passage is defined as a first passage count. A number of passages arranged side by side in the arrangement direction in the second groove passage is defined as a second passage count. The first passage count of a predetermined section in the first groove passage is different from the second passage count of a section in the second groove passage that is adjacent to the predetermined section.

To achieve the first objective, a separator for a fuel cell in a third aspect includes a contact surface configured to contact a power generating unit of the fuel cell, and groove passages arranged side by side in the contact surface. Reactant gas flows through the groove passages. An upstream portion and a downstream portion in a flow direction of the reactant gas in each groove passage are defined as an upstream portion and a downstream portion, respectively. At least one of the groove passages includes a wavy section that extends in a wavy shape in planar directions of the contact surface. The wavy section includes tributary passages and a merging portion at which the tributary passages merge from an upstream side toward a downstream side.

To achieve the second objective, a separator for a fuel cell in a second aspect includes a contact surface configured to contact a power generating unit of the fuel cell, and groove passages arranged side by side in the contact surface. Reactant gas flows through the groove passages. A direction in which the groove passages are arranged side by side is defined as an arrangement direction. The groove passages include a first groove passage and a second groove passage that extend in wavy shapes in planar directions of the contact surface and are adjacent to each other in the arrangement direction. A wavelength of a predetermined section in the first groove passage is different from a wavelength of a section in the second groove passage that is adjacent to the predetermined section.

To achieve the second objective, a separator for a fuel cell in a third aspect includes a contact surface configured to contact a power generating unit of the fuel cell, and groove passages arranged side by side in the contact surface. Reactant gas flows through the groove passages. A direction in which the groove passages are arranged side by side is defined as an arrangement direction. The groove passages include a first groove passage and a second groove passage that extend in wavy shapes in planar directions of the contact surface and are adjacent to each other in the arrangement direction. An amplitude of a predetermined section in the first groove passage is different from an amplitude of a section in the second groove passage that is adjacent to the predetermined section.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A separator for a fuel cell according to a first embodiment will now be described with reference to FIGS. 1 to 4.

<Overall Configuration of Single Cell of Fuel Cell Stack>

Figure 1:
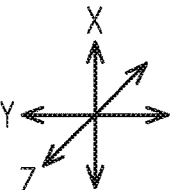
FIG. 1 is an exploded perspective view showing a single cell of a fuel cell.

As shown in FIG. 1, a single cell for a fuel cell stack includes a membrane electrode assembly 110 (hereinafter, referred to as MEA 110), a frame member 120, which supports the MEA 110, and two separators 130, 140, which hold the MEA 110 and the frame member 120 between them.

The single cell is a rectangular plate as a whole.

In the following description, the direction in which the separator 130, the layer including the MEA 110 and the frame member 120, and the separator 140 are stacked will be referred to as a first direction X.

A longitudinal direction of the single cell, which is orthogonal to the first direction X, will be referred to as a second direction Y.

Also, a direction that is orthogonal to both of the first direction X and the second direction Y will be referred to as a third direction Z.

The single cell has inlet holes 191, 193, 195 for introducing reactant gas or cooling medium into the single cell and outlet holes 192, 194, 196 for discharging the reactant gas and the cooling medium in the single cell to the outside. In the present embodiment, the inlet hole 191 and the outlet hole 192 are holes through which fuel gas flows. The inlet hole 193 and the outlet hole 194 are holes through which cooling medium flows. The inlet hole 195 and the outlet hole 196 are holes through which oxidant gas flows. The fuel gas is hydrogen gas. The cooling medium is water. The oxidant gas is air.

The inlet holes 191, 193, 195 and the outlet holes 192, 194, 196 each have a rectangular shape elongated in the second direction Y in plan view, and extend in the first direction X through the single cell. The inlet hole 191 and the outlet holes 194, 196 are located on one side in the second direction Y of the single cell (on the left side in the left-right direction in FIG. 1). The inlet hole 191 and the outlet holes 194, 196 are arranged side by side in the third direction Z while being spaced apart from each other. The outlet hole 192 and the inlet holes 193, 195 are located on the other side in the second direction Y (on the right side in FIG. 1). The outlet hole 192 and the inlet holes 193, 195 are arranged side by side in the third direction Z while being spaced apart from each other.

<MEA 110>

As shown in FIG. 1, the MEA 110 has a rectangular shape elongated in the second direction Y.

The MEA 110 includes a solid polymer electrolyte membrane (not shown; hereinafter referred to as an electrolyte membrane) and electrodes 111A, 111B respectively provided on opposite surfaces of the electrolyte membrane. In the present embodiment, the electrode that is joined to one side in the first direction X (the upper side in the up-down direction in FIG. 1) of the electrolyte membrane (not shown) is a cathode 111A. Also, the electrode joined to the other side in the first direction X (the lower side in the in FIG. 1) of the electrolyte membrane is an anode 111B.

The electrodes 111A, 111B each include a catalyst layer (not shown) joined to the electrolyte membrane and a gas diffusion layer 112 (hereinafter referred to as a GDL 112), which is joined to the catalyst layer.

The MEA 110 corresponds to a power generating unit of the fuel cell according to the present disclosure.

<Frame Member 120>

As shown in FIG. 1, the frame member 120 has a rectangular shape elongated in the second direction Y.

The frame member 120 is made of, for example, a hard plastic.

The frame member 120 includes through-holes 121, 122, 123, 124, 125, 126, which are respectively part of the holes 191, 192, 193, 194, 195, 196.

The frame member 120 includes an opening 127, which has a rectangular shape elongated in the second direction Y, in a center. The MEA 110 is joined to the edge of the opening 127 from one side in the first direction X (upper side as viewed in FIG. 1).

<Separator 130>

As shown in FIG. 1, the separator 130 is a rectangular plate elongated in the second direction Y.

The separator 130 is formed by pressing, for example, a metal member made of titanium or stainless steel.

The separator 130 is provided on the side of the MEA 110 on which the anode 111B is provided. The separator 130 includes a first surface 130A and a second surface 130B, which is on a side opposite to the first surface 130A. The first surface 130A includes a contact surface 130a, which contacts the MEA 110 (refer to FIG. 2).

The separator 130 includes through-holes 131, 132, 133, 134, 135, 136, which are respectively part of the holes 191, 192, 193, 194, 195, 196. In the third direction Z, the through-holes 131, 134, 136 are provided at positions that correspond to the through-holes 121, 124, 126 of the frame member 120. Also, in the third direction Z, the through-holes 132, 133, 135 are provided at positions that correspond to the through-holes 122, 123, 125 of the frame member 120.

The separator 130 includes groove passages 137 through which fuel gas flows and groove passages 138 through which cooling medium flows. FIG. 1 illustrates, in a simplified manner, the outer edge of a section in the separator 130 that includes the groove passages 137 and the outer edge of a section in the separator 130 that includes the groove passages 138.

<Groove Passages 137, 138>

Figure 2:
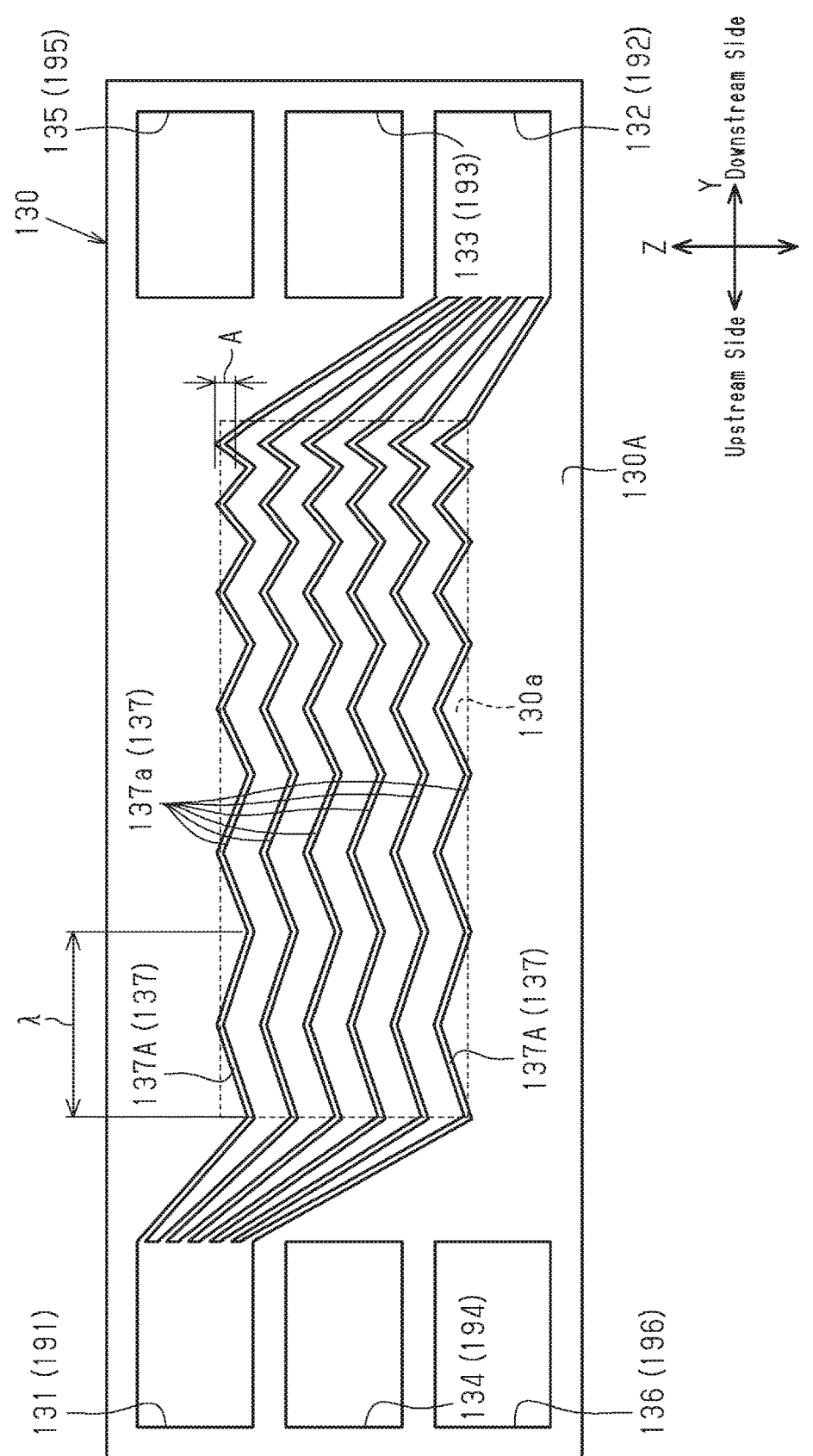
FIG. 2 is a plan view of a separator for a fuel cell according to a first embodiment that is used in the single cell shown in FIG. 1 and includes groove passages arranged side by side, through which fuel gas flows.

As shown in FIG. 2, the groove passages 137 connect the through-hole 131 and the through-hole 132 to each other. The groove passages 137 are provided in the first surface 130A. In the present embodiment, the groove passages 137, of which there are six, are arranged side by side in the third direction Z while being spaced apart from each other. That is, the six groove passages 137 are independent from one another.

In the following description, an upstream portion and a downstream portion in the flow direction of fuel gas in the groove passages 137 will simply be referred to as an upstream portion and a downstream portion, respectively.

The width, that is, the cross-sectional flow area of each groove passage 137 is constant over the entire groove passage 137 in the extending direction. The groove passages 137 have the same width.

Each groove passage 137 includes a wavy section 137a. The wavy sections 137a are provided in the contact surface 130a and extend in wavy shapes in planar directions of the contact surface 130a. An amplitude A of each wavy section 137a is constant over the entire wavy section 137a in the extending direction. A wavelength λ of each wavy section 137a is smaller in the downstream portion than in the upstream portion. Specifically, the wavelength λ of each wavy section 137a decreases toward the downstream end. The wavelength λ of each wavy section 137a differs from one wave to another. In the present embodiment, all the groove passages 137 each include the wavy section 137a. The wavy sections 137a have the same shape.

Figure 3:
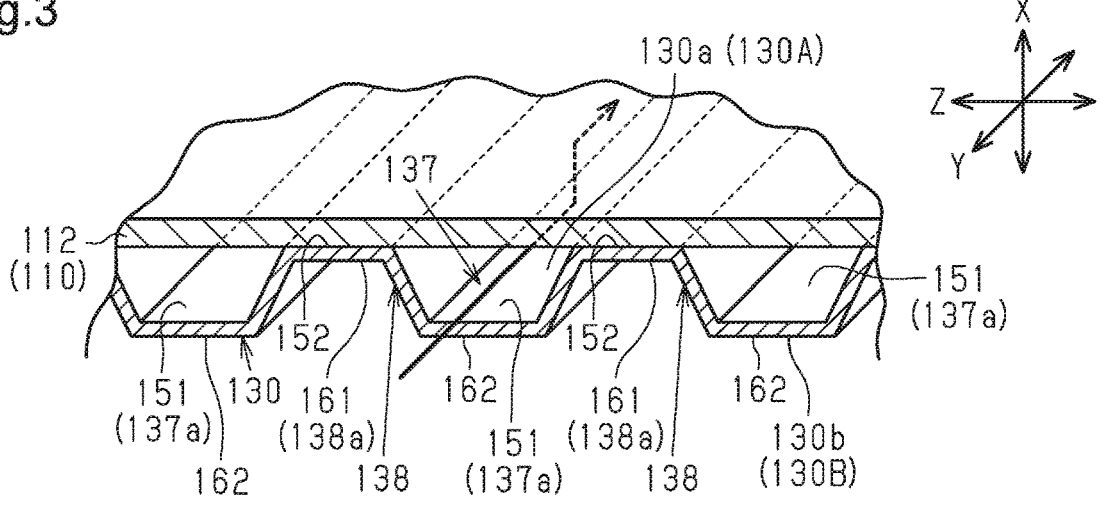
FIG. 3 is a perspective view illustrating a flow of fuel gas that permeates into a gas diffusion layer from the groove passages shown in FIG. 2.

As shown in FIG. 3, the wavy sections 137a include recesses 151 formed in the first surface 130A of the separator 130. Ribs 152, which are protrusions, are provided between the recesses 151. The protruding ends of the ribs 152 are in contact with the GDL 112 of the MEA 110, which is adjacent to the separator 130.

As shown in FIG. 2, the groove passages 137 include an outer side groove passage 137A, which is located at the outermost position in the third direction Z. The outer side groove passage 137A includes sections that are located outside the outer edge of the contact surface 130a in the third direction Z.

As shown in FIG. 1, the groove passages 138 connect the through-hole 133 and the through-hole 134 to each other. The groove passages 138 are provided in the second surface 130B. In the groove passages 138, cooling medium flows in a direction opposite to the flowing direction of the fuel gas flowing through the groove passages 137.

As shown in FIG. 3, the groove passages 138 include wavy sections 138a. The wavy sections 138a are provided in a surface 130b on a side opposite to the contact surface 130a and extend in wavy shapes in planar directions of the surface 130b. The wavy sections 138a include recesses 161 formed in the second surface 130B of the separator 130. Ribs 162, which are protrusions, are provided between the recesses 161. The back side of each rib 162 is the recess 151 that forms the wavy section 137a of each groove passage 137. Likewise, the back side of each rib 152 is the recess 161 that forms the wavy section 138a of each groove passage 138. That is, the shapes of protrusions and recesses of the wavy sections 138a in the groove passages 138 and the shapes of recesses and protrusions of the wavy sections 137a in the groove passages 137 conform to each other.

<Separator 140>

As shown in FIG. 1, the separator 140 is a rectangular plate elongated in the second direction Y.

The separator 140 is formed by pressing, for example, a metal member made of titanium or stainless steel.

The separator 140 is provided on the side of the MEA 110 that corresponds to the cathode 111A. The separator 140 includes a first surface 140A and a second surface 140B, which is on a side opposite to the first surface 140A. The first surface 140A includes a contact surface, which contacts the MEA 110.

The separator 140 includes through-holes 141, 142, 143, 144, 145, 146, which are respectively part of the holes 191, 192, 193, 194, 195, 196. In the third direction Z, the through-holes 141, 144, 146 are provided at positions that correspond to the through-holes 121, 124, 126 of the frame member 120. Also, in the third direction Z, the through-holes 142, 143, 145 are provided at positions that correspond to the through-holes 122, 123, 125 of the frame member 120.

As shown in FIG. 1, the separator 140 includes groove passages 147 through which oxidant gas flows and groove passages 148 through which cooling medium flows. FIG. 1 illustrates, in a simplified manner, the outer edge of a section in the separator 140 that includes the groove passages 147 and the outer edge of a section in the separator 140 that includes the groove passages 148.

The groove passages 147 connect the through-hole 145 and the through-hole 146 to each other. In the groove passages 147, the oxidant gas flows in a direction opposite to the flowing direction of the fuel gas flowing through the groove passages 137.

The groove passages 148 connect the through-hole 143 and the through-hole 144 to each other. In the groove passages 148, the cooling medium flows in the same as the flowing direction of the oxidant gas flowing through the groove passages 147.

Operation of the first embodiment will now be described.

Figure 4:
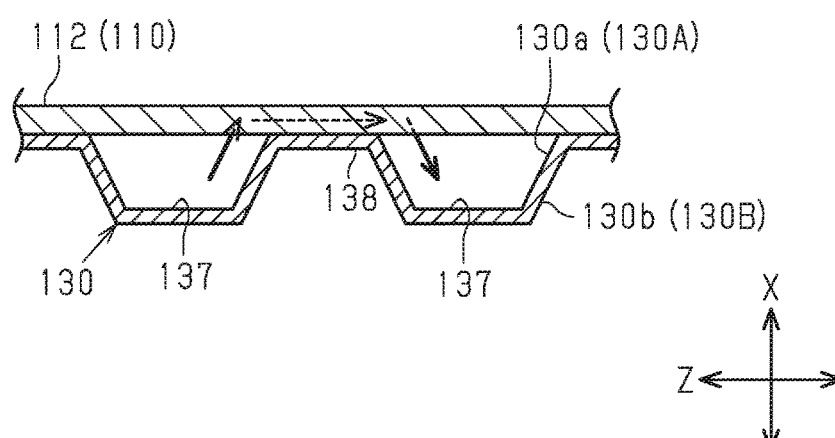
FIG. 4 is a cross-sectional view illustrating a flow of fuel gas that permeates into the gas diffusion layer from a groove passage shown in FIG. 2.

Arrows in FIGS. 3 and 4 indicate the flow of fuel gas that permeates into the GDL 112 from the groove passages 137.

As shown in FIG. 3, in the process of flowing through the groove passages 137 of the separator 130, the fuel gas gradually permeates into the MEA 110, which is adjacent to the separator 130. More specifically, the fuel gas permeates into the GDL 112 of the MEA 110. In the configuration of the first embodiment, the wavelength λ of the wavy section 137a of each groove passages 137 is smaller in the downstream portion than in the upstream portion. Accordingly, the pressure loss of the fuel gas is larger in the downstream portion than in the upstream portion in each groove passage 137. This promotes permeation of the fuel gas into the GDL 112 in the downstream portion of each groove passages 137 as compared to a case in which the wavelength λ in the downstream portion of the wavy section 137a is the same as the wavelength λ in the upstream portion.

The first embodiment has the following advantages.

(1) The wavy section 137a of each groove passage 137 extends in a wavy shape in planar directions of the contact surface 130a. The wavelength λ of each wavy section 137a is smaller in the downstream portion than in the upstream portion.

This configuration operates in the above-described manner. This configuration thus limits reduction in the amount of fuel gas that permeates into the GDL 112 in the downstream portion of each groove passage 137. This increases power generation in the downstream portion of each groove passages 137. Accordingly, the power generation efficiency of the fuel cell is increased.

(2) The wavelength λ of each wavy section 137a decreases toward the downstream end.

With this configuration, the pressure loss of fuel gas increases toward the downstream end of the groove passage 137. Accordingly, permeation of the fuel gas into the GDL 112 is more promoted toward the downstream end, at which the flow rate of the fuel gas flowing through the groove passage 137 is small. This configuration thus limits reduction in the amount of the fuel gas that permeates into the GDL 112 effectively.

(3) The groove passages 137 are independent from one another.

For example, if adjacent groove passages 137 were connected to each other, the dynamic pressure of the fuel gas flowing through the groove passages 137 would be equalized at the connected sections. It thus would be difficult to adjust the pressure loss of the fuel gas in each groove passage 137 by differentiating the wavelength λ between the upstream portion and the downstream portion of each wavy section 137a. However, the groove passages 137 are independent from one another in the above-described configuration. It is thus possible to easily adjust the pressure loss of fuel gas in each groove passage 137 by differentiating the wavelength λ between the upstream portion and the downstream portion of each wavy section 137a.

(4) Each groove passage 137 includes the wavy section 137a, which extends in a wavy shape in planar directions of the contact surface 130a.

With this configuration, the pressure loss of fuel gas is larger in the downstream portion than in the upstream portion in each groove passage 137. This thus further effectively limits reduction in the amount of the fuel gas that permeates into the GDL 112 in the downstream portion of the groove passages 137.

(5) The groove passages 137 are arranged side by side in the third direction Z and include the outer side groove passage 137A, which is located at the outermost position in the third direction Z. The outer side groove passage 137A includes sections that are located outside the outer edge of the contact surface 130a in the third direction Z.

When the pressure loss of fuel gas is different between adjacent groove passages 137, some of the fuel gas flowing through the groove passage 137 in which the pressure loss is larger may permeate into the GDL 112 and flow to the groove passage 137 in which the pressure loss is smaller, as shown in FIG. 4. Such permeation of fuel gas into a section of the GDL 112 between adjacent groove passages 137 also generates power.

However, the outer side groove passage 137A does not have a groove passage 137 on its outer side in the third direction Z. Thus, if the entire outer side groove passage 137A were located inside the contact surface 130a in the third direction Z, it would be difficult to cause fuel gas to permeate into a section of the GDL 112 that is on the outer side of the outer side groove passage 137A by using a difference in the pressure loss of fuel gas described above. This would reduce the power generation efficiency.

In this regard, the above-described configuration reduces the ratio of the section of the GDL 112 that is located on the outer side of the outer side groove passage 137A. This allows fuel gas to permeate into a wider area of the GDL 112. The power generation efficiency is therefore improved.
<Modifications>

The first embodiment may be modified as follows. The first embodiment and the following modifications can be combined as long as the combined modifications remain technically consistent with each other.

The shapes of the inlet holes 191, 193, 195 and the outlet holes 192, 194, 196 are not limited to a rectangular shape in plan view as in the first embodiment. For example, the shapes of the inlet holes 191, 193, 195 and the outlet holes 192, 194, 196 may be square or stadium-shaped in plan view.

The flows of the reactant gas through the holes 191, 192, 193, 194, 195, 196 are not limited to those described in the first embodiment. For example, the hole 196 may be used as an outlet hole for oxidant gas, and the hole 195 may be used as an outlet hole for the oxidant gas. Accordingly, the hole 194 may be used as an inlet hole for cooling medium, and the hole 193 may be used as the outlet hole for the cooling medium. That is, the oxidant gas that flows through the groove passages 147 and the cooling medium that flows through the groove passages 138, 148 may flow in the same direction as the fuel gas flowing through the groove passages 137.

The number of the groove passages 137 is not limited to six as described in the first embodiment, but may be less than or greater than six.

Figure 5:
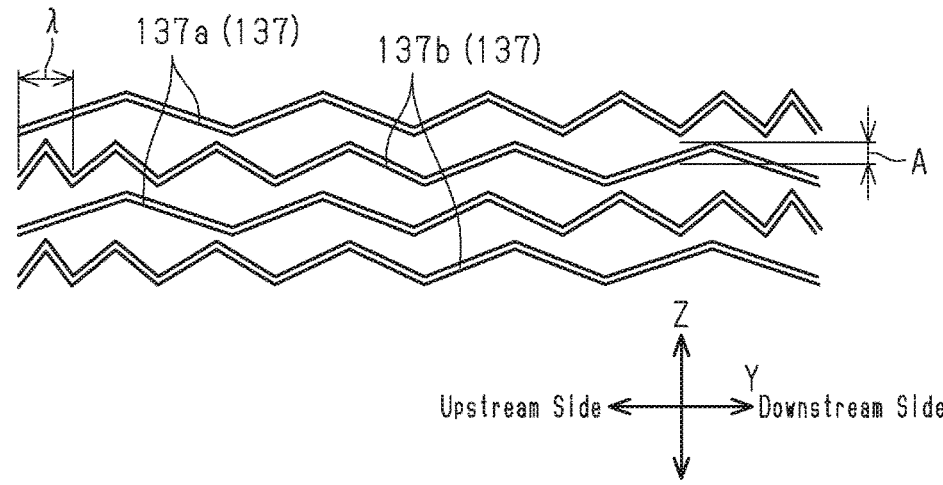
FIG. 5 is a plan view showing groove passages according to a modification.

The separator 130 does not necessarily need to be configured such that the wavy sections 137a have the same shape as described in the first embodiment. For example, as shown in FIG. 5, the separator 130 may be configured such that groove passages 137 including wavy sections 137b and the groove passages 137 including the wavy sections 137a are arranged side by side alternately in the third direction Z. The wavy sections 137b extend in wavy shapes in planar directions of the contact surface 130a. The amplitude A of each wavy section 137b is constant over the entire wavy section 137b in the extending direction. The wavelength λ of each wavy section 137b increases toward the downstream end. The wavelength λ of each wavy section 137b in the upstream portion is smaller than the wavelength λ of each wavy section 137a in the upstream portion. The wavelength λ of each wavy section 137b in the downstream portion is larger than the wavelength λ of each wavy section 137a in the downstream portion.

With this configuration, the pressure loss of fuel gas is different between adjacent groove passages 137. Thus, in the upstream portion, some of the fuel gas flowing through the wavy section 137b of the groove passage 137 in which the pressure loss is relatively large permeates into the GDL 112 and flows to the wavy section 137a of the groove passage 137 in which the pressure loss is relatively small. Also, in the downstream portion, some of the fuel gas flowing through the wavy section 137a of the groove passage 137 in which the pressure loss is relatively large permeates into the GDL 112 and flows to the wavy section 137b of the groove passage 137 in which the pressure loss is relatively small. Such permeation of fuel gas into a section of the GDL 112 between adjacent groove passages 137 also generates power. Accordingly, the power generation efficiency of the fuel cell is increased.

The width, that is, the cross-sectional flow area of each groove passage 137 does not necessarily need to be constant over the entire groove passage 137 in the extending direction, as long as the operation and the advantages of the present disclosure are achieved.

The groove passages 137 do not necessarily need to be configured such that the amplitude A of each wavy section 137a is constant over the entire wavy section 137a in the extending direction.

The groove passages 137 do not necessarily need to be configured such that the outer side groove passage 137A includes sections that are located outside the outer edge of the contact surface 130a in the third direction Z as described in the first embodiment. For example, the outer side groove passage 137A may be located at the same position as or on the inner side of the outer edge of the contact surface 130a in the third direction Z.

The groove passages 137 do not necessarily need to extend in wavy shapes in planar directions of the contact surface 130a. That is, not all the groove passages 137 need to have the wavy section 137a, but it suffices if at least one of the groove passages 137 has the wavy section 137a.

The groove passages 137 do not necessarily need to be independent from one another as described in the first embodiment. For example, two of the groove passages 137 adjacent to each other may be connected to each other by another passage that extends in the third direction Z.

Figure 6:
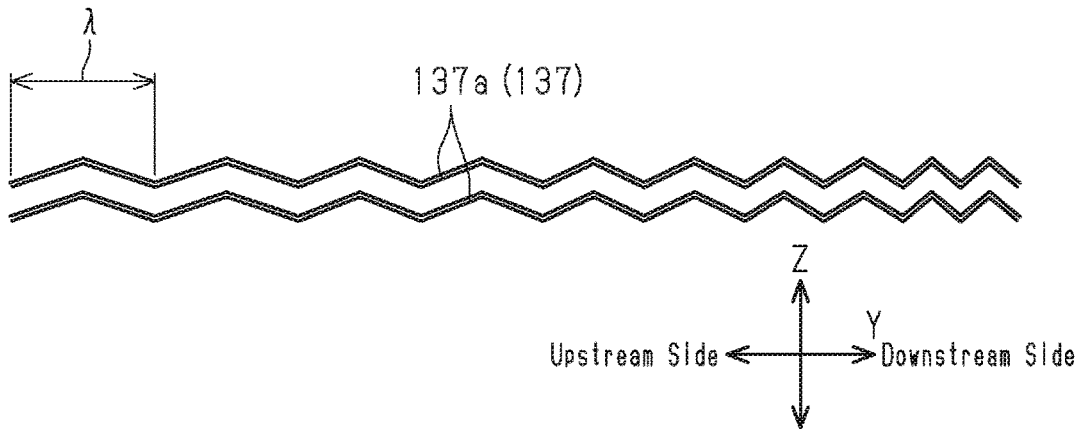
FIG. 6 is a plan view showing groove passages according to a modification.
Figure 7:
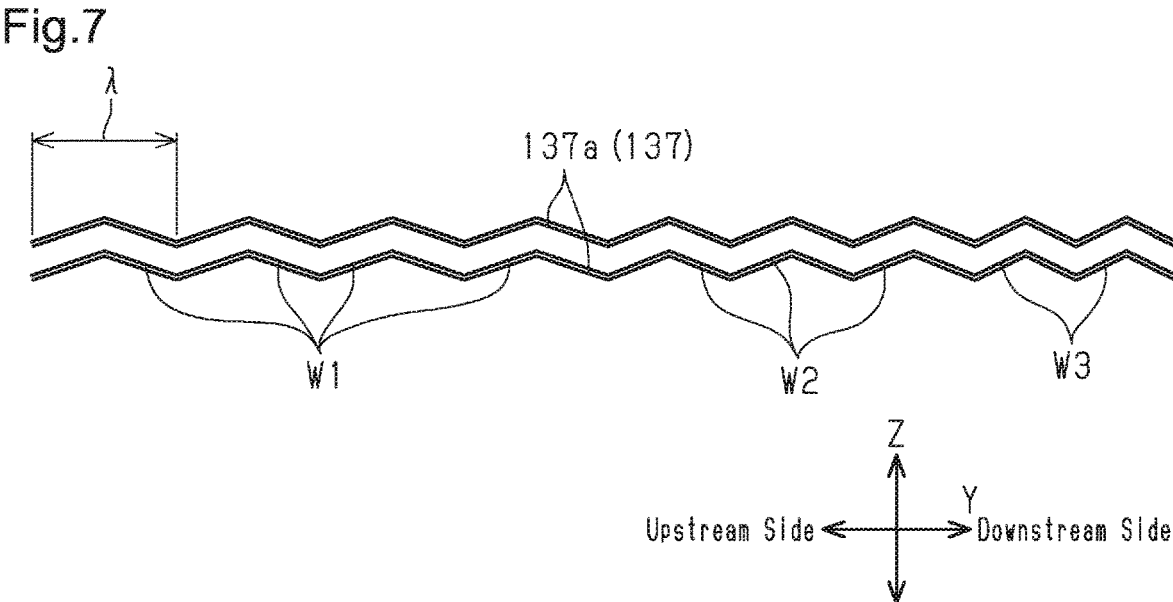
FIG. 7 is a plan view showing groove passages according to a modification.

The wavelength λ of the wavy section 137a of each groove passage 137 does not necessarily need to differ from one wave to another as described in the first embodiment. For example, as shown in FIG. 6, each set of a fixed even number of waves (two in the example of FIG. 6) may have a smaller wavelength λ than the other set of the fixed even number of waves on the upstream side. Alternatively, each set of a fixed odd number of waves may have a smaller wavelength λ than the other set of the fixed odd number of waves on the upstream side. Further, each set of a fixed even or odd number of waves may have a smaller wavelength λ than the other set of the fixed even or odd number of waves on the upstream side. For example, the wavy sections 137a may be configured as shown in FIG. 7 such that four waves W1 of the same the wavelength λ appear consecutively, three waves W2 of the wavelength λ smaller than that of the waves W1 appear consecutively, and two waves W2 of the wavelength λ smaller than that of the waves W3 appear consecutively.

The separator for a fuel cell according to the present disclosure is not limited to the separator 130, which is joined to the side of the MEA 110 that corresponds to the anode 111B as described in the first embodiment, but may be employed in the separator 140, which is joined to the side corresponding to the cathode 111A.

The separators 130, 140 do not necessarily need to be formed by pressing a metal member, but may be formed by cutting or etching.

The material for the separators 130, 140 are not limited to titanium or stainless steel, but may be aluminum or carbon.

Second Embodiment

A separator for a fuel cell according to a second embodiment will now be described with reference to FIGS. 8 to 11.
<Overall Configuration of Single Cell of Fuel Cell Stack>

Figure 8:
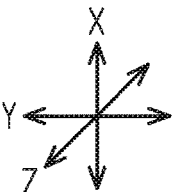
FIG. 8 is an exploded perspective view showing a single cell of a fuel cell.

As shown in FIG. 8, a single cell for a fuel cell stack includes a membrane electrode assembly 210 (hereinafter, referred to as MEA 210), a frame member 220, which supports the MEA 210, and two separators 230, 240, which hold the MEA 210 and the frame member 220 between them.

The single cell is a rectangular plate as a whole.

In the following description, the direction in which the separator 230, the layer including the MEA 210 and the frame member 220, and the separator 240 are stacked will be referred to as a first direction X.

A longitudinal direction of the single cell, which is orthogonal to the first direction X, will be referred to as a second direction Y.

Also, a direction that is orthogonal to both of the first direction X and the second direction Y will be referred to as a third direction Z.

The single cell has inlet holes 291, 293, 295 for introducing reactant gas or cooling medium into the single cell and outlet holes 292, 294, 296 for discharging the reactant gas and the cooling medium in the single cell to the outside. In the present embodiment, the inlet hole 291 and the outlet hole 292 are holes through which fuel gas flows. The inlet hole 293 and the outlet hole 294 are holes through which cooling medium flows. The inlet hole 295 and the outlet hole 296 are holes through which oxidant gas flows. The fuel gas is hydrogen gas. The cooling medium is water. The oxidant gas is air.

The inlet holes 291, 293, 295 and the outlet holes 292, 294, 296 each have a rectangular shape elongated in the second direction Y in plan view, and extend in the first direction X through the single cell. The inlet hole 291 and the outlet holes 294, 296 are located on one side in the second direction Y of the single cell (on the left side in the left-right direction in FIG. 8). The inlet hole 291 and the outlet holes 294, 296 are arranged side by side in the third direction Z while being spaced apart from each other. The outlet hole 292 and the inlet holes 293, 295 are located on the other side in the second direction Y (on the right side in FIG. 8). The outlet hole 292 and the inlet holes 293, 295 are arranged side by side in the third direction Z while being spaced apart from each other.
<MEA 210>

As shown in FIG. 8, the MEA 210 has a rectangular shape elongated in the second direction Y.

The MEA 210 includes a solid polymer electrolyte membrane (not shown; hereinafter referred to as an electrolyte membrane) and electrodes 211A, 211B respectively provided on opposite surfaces of the electrolyte membrane. In the present embodiment, the electrode that is joined to one side in the first direction X (the upper side in the up-down direction in FIG. 8) of the electrolyte membrane (not shown) is a cathode 211A. Also, the electrode joined to the other side in the first direction X (the lower side in the in FIG. 8) of the electrolyte membrane is an anode 211B.

The electrodes 211A, 211B each include a catalyst layer (not shown) joined to the electrolyte membrane and a gas diffusion layer 212 (hereinafter referred to as a GDL 212), which is joined to the catalyst layer.

The MEA 210 corresponds to a power generating unit of the fuel cell according to the present disclosure.
<Frame Member 220>

As shown in FIG. 8, the frame member 220 has a rectangular shape elongated in the second direction Y.

The frame member 220 is made of, for example, a hard plastic.

The frame member 220 includes through-holes 221, 222, 223, 224, 225, 226, which are respectively part of the holes 291, 292, 293, 294, 295, 296.

The frame member 220 includes an opening 227, which has a rectangular shape elongated in the second direction Y, in a center. The MEA 210 is joined to the edge of the opening 227 from one side in the first direction X (upper side as viewed in FIG. 8).
<Separator 230>

As shown in FIG. 8, the separator 230 is a rectangular plate elongated in the second direction Y.

The separator 230 is formed by pressing, for example, a metal member made of titanium or stainless steel.

The separator 230 is provided on the side of the MEA 210 on which the anode 211B is provided. The separator 230 includes a first surface 230A and a second surface 230B, which is on a side opposite to the first surface 230A. The first surface 230A includes a contact surface 230a, which contacts the MEA 210 (refer to FIG. 9).

The separator 230 includes through-holes 231, 232, 233, 234, 235, 236, which are respectively part of the holes 291, 292, 293, 294, 295, 296. In the third direction Z, the through-holes 231, 234, 236 are provided at positions that correspond to the through-holes 221, 224, 226 of the frame member 220. Also, in the third direction Z, the through-holes 232, 233, 235 are provided at positions that correspond to the through-holes 222, 223, 225 of the frame member 220.

The separator 230 includes groove passages 237 through which fuel gas flows and groove passages 238 through which cooling medium flows. FIG. 8 illustrates, in a simplified manner, the outer edge of a section in the separator 230 that includes the groove passages 237 and the outer edge of a section in the separator 230 that includes the groove passages 238.

<Groove Passages 237, 238>

Figure 9:
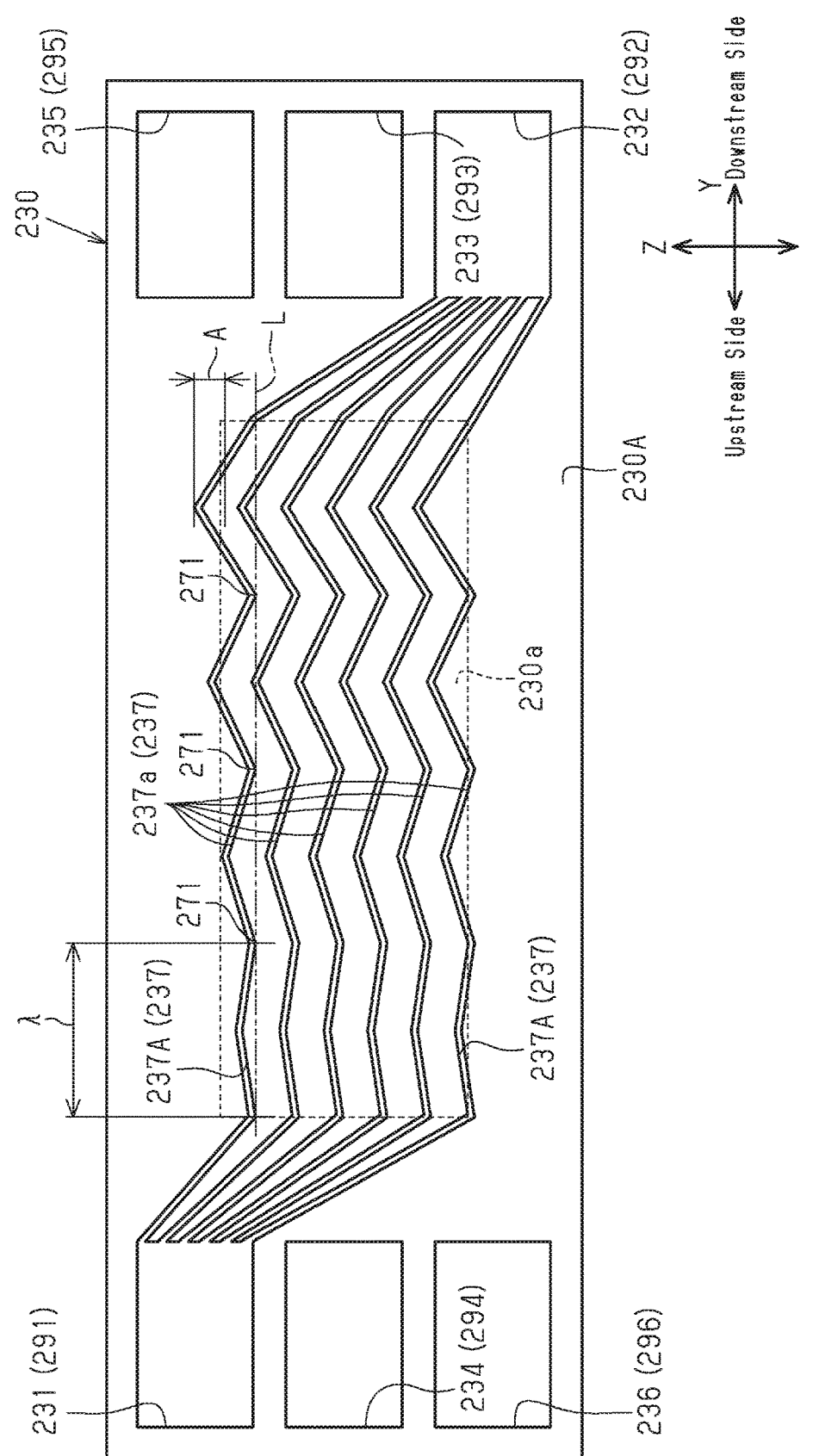
FIG. 9 is a plan view of a separator for a fuel cell according to a second embodiment that is used in the single cell shown in FIG. 8 and includes groove passages arranged side by side, through which fuel gas flows.

As shown in FIG. 9, the groove passages 237 connect the through-hole 231 and the through-hole 232 to each other. The groove passages 237 are provided in the first surface 230A. In the present embodiment, the groove passages 237, of which there are six, are arranged side by side in the third direction Z while being spaced apart from each other. That is, the six groove passages 237 are independent from one another.

In the following description, an upstream portion and a downstream portion in the flow direction of fuel gas in the groove passages 237 will simply be referred to as an upstream portion and a downstream portion, respectively.

The width, that is, the cross-sectional flow area of each groove passage 237 is constant over the entire groove passage 237 in the extending direction. The groove passages 237 have the same width.

Each groove passage 237 includes a wavy section 237$a$. The wavy sections 237$a$ are provided in the contact surface 230$a$ and extend in wavy shapes in planar directions of the contact surface 230$a$. The wavelength λ of each wavy section 237$a$ is constant over the entire wavy section 237$a$ in the extending direction. The amplitude A of each wavy section 237$a$ is larger in the downstream portion than in the upstream portion. Specifically, the amplitude A of each wavy section 237$a$ increases toward the downstream end. The amplitude A of each wavy section 237$a$ differ from one wave to another. Each wavy section 237$a$ includes troughs 271 on one side in the third direction Z (lower side in the up-down direction in FIG. 9). The troughs 271 are located on an axis L along the second direction Y. In the present embodiment, the six groove passages 237 each include the wavy section 237$a$. The wavy sections 237$a$ have the same shape.

Figure 10:
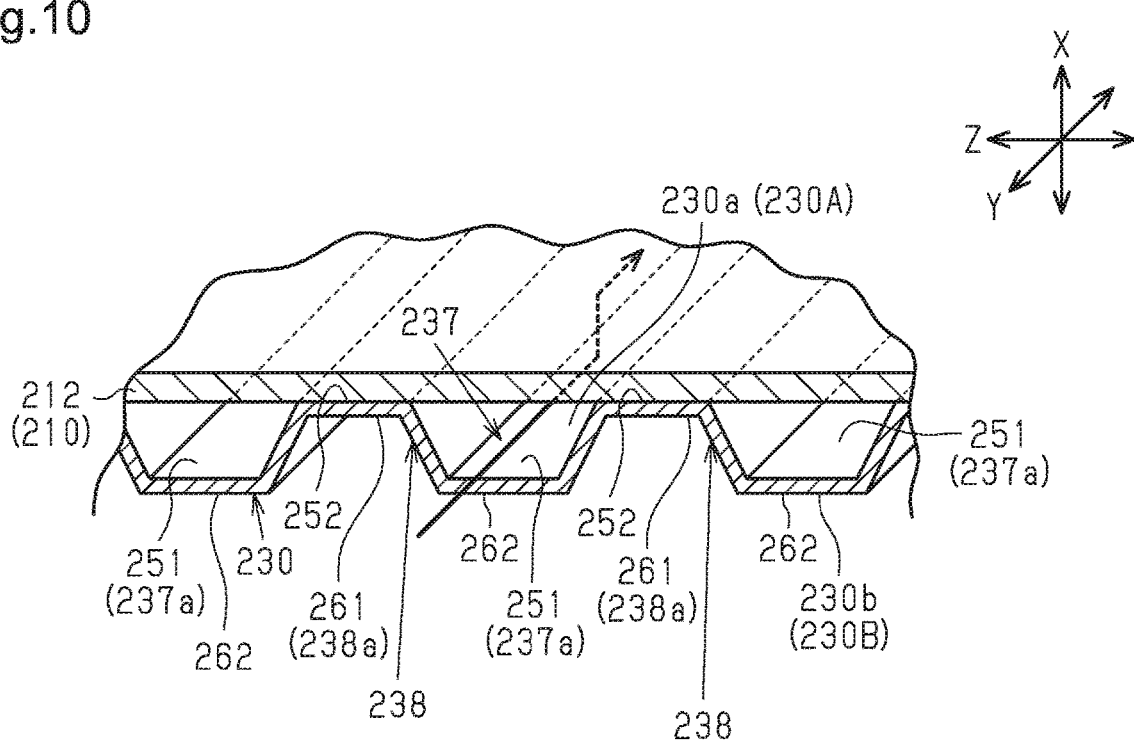
FIG. 10 is a perspective view illustrating a flow of fuel gas that permeates into a gas diffusion layer from the groove passages shown in FIG. 9.

As shown in FIG. 10, the wavy sections 237$a$ include recesses 251 formed in the first surface 230A of the separator 230. Ribs 252, which are protrusions, are provided between the recesses 251. The protruding ends of the ribs 252 are in contact with the GDL 212 of the MEA 210, which is adjacent to the separator 230.

As shown in FIG. 9, the groove passages 237 include an outer side groove passage 237A, which is located at the outermost position in the third direction Z. The outer side groove passage 237A includes sections that are located outside the outer edge of the contact surface 230$a$ in the third direction Z.

As shown in FIG. 8, the groove passages 238 connect the through-hole 233 and the through-hole 234 to each other. The groove passages 238 are provided in the second surface 230B. In the groove passages 238, cooling medium flows in a direction opposite to the flowing direction of the fuel gas flowing through the groove passages 237.

As shown in FIG. 10, the groove passages 238 include wavy sections 238$a$. The wavy sections 238$a$ are provided in a surface 230$b$ on a side opposite to the contact surface 230$a$ and extend in wavy shapes in planar directions of the surface 230$b$. The wavy sections 238$a$ include recesses 261 formed in the second surface 230B of the separator 230. Ribs 262, which are protrusions, are provided between the recesses 261. The back side of each rib 262 is the recess 251 that forms the wavy section 237$a$ of each groove passage 237. Likewise, the back side of each rib 252 is the recess 261 that forms the wavy section 238$a$ of each groove passage 238. That is, the shapes of protrusions and recesses of the wavy sections 238$a$ in the groove passages 238 and the shapes of recesses and protrusions of the wavy sections 237$a$ in the groove passages 237 conform to each other.

<Separator 240>

As shown in FIG. 8, the separator 240 is a rectangular plate elongated in the second direction Y.

The separator 240 is formed by pressing, for example, a metal member made of titanium or stainless steel.

The separator 240 is provided on the side of the MEA 210 that corresponds to the cathode 211A. The separator 240 includes a first surface 240A and a second surface 240B, which is on a side opposite to the first surface 240A. The first surface 240A includes a contact surface, which contacts the MEA 210.

The separator 240 includes through-holes 241, 242, 243, 244, 245, 246, which are respectively part of the holes 291, 292, 293, 294, 295, 296. In the third direction Z, the through-holes 241, 244, 246 are provided at positions that correspond to the through-holes 221, 224, 226 of the frame member 220. Also, in the third direction Z, the through-holes 242, 243, 245 are provided at positions that correspond to the through-holes 222, 223, 225 of the frame member 220.

As shown in FIG. 8, the separator 240 includes groove passages 247 through which oxidant gas flows and groove passages 248 through which cooling medium flows. FIG. 8 illustrates, in a simplified manner, the outer edge of a section in the separator 240 that includes the groove passages 247 and the outer edge of a section in the separator 240 that includes the groove passages 248.

The groove passages 247 connect the through-hole 245 and the through-hole 246 to each other. In the groove passages 247, the oxidant gas flows in a direction opposite to the flowing direction of the fuel gas flowing through the groove passages 237.

The groove passages 248 connect the through-hole 243 and the through-hole 244 to each other. In the groove passages 248, the cooling medium flows in the same as the flowing direction of the oxidant gas flowing through the groove passages 247.

Operation of the second embodiment will now be described.

Figure 11:
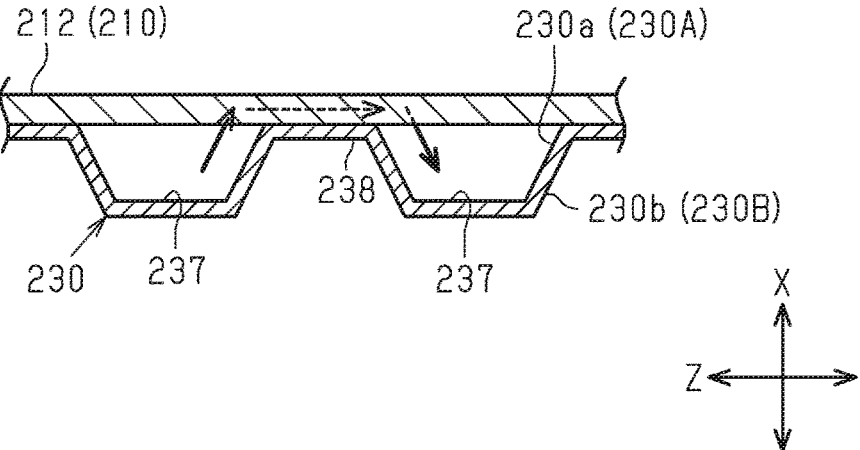
FIG. 11 is a cross-sectional view illustrating a flow of fuel gas that permeates into the gas diffusion layer from a groove passage shown in FIG. 9.

Arrows in FIGS. 10 and 11 indicate the flow of fuel gas that permeates into the GDL 212 from the groove passages 237.

As shown in FIG. 10, in the process of flowing through the groove passages 237 of the separator 230, the fuel gas gradually permeates into the MEA 210, which is adjacent to the separator 230. More specifically, the fuel gas permeates into the GDL 212 of the MEA 210. In the configuration of the second embodiment, the amplitude A of each wavy section 237$a$ of the groove passages 237 is larger in the downstream portion than in the upstream portion. Accordingly, the pressure loss of the fuel gas is larger in the downstream portion than in the upstream portion in each groove passage 237. This promotes permeation of the fuel gas into the GDL 212 in the downstream portion of each groove passages 237 as compared to a case in which the amplitude A in the downstream portion of the wavy section 237$a$ is the same as the amplitude A in the upstream portion.

The second embodiment has the following advantages.

(6) The wavy section 237$a$ of each groove passage 237 extends in a wavy shape in planar directions of the contact surface 230$a$. The amplitude A of each wavy section 237$a$ is larger in the downstream portion than in the upstream portion.

This configuration operates in the above-described manner. This configuration thus limits reduction in the amount of fuel gas that permeates into the GDL 212 in the downstream portion of each groove passage 237. This increases power generation in the downstream portion of each groove passages 237. Accordingly, the power generation efficiency of the fuel cell is increased.

(7) The amplitude A of each wavy section 237a increases toward the downstream end.

With this configuration, the pressure loss of fuel gas increases toward the downstream end of the groove passage 237. Accordingly, permeation of the fuel gas into the GDL 212 is more promoted toward the downstream end, at which the flow rate of the fuel gas flowing through the groove passage 237 is small. This configuration thus limits reduction in the amount of the fuel gas that permeates into the GDL 212 effectively.

(8) The groove passages 237 are independent from one another.

For example, if adjacent groove passages 237 were connected to each other, the dynamic pressure of the fuel gas flowing through the groove passages 237 would be equalized at the connected sections. It thus would be difficult to adjust the pressure loss of the fuel gas in each groove passage 237 by differentiating the amplitude A between the upstream portion and the downstream portion of each wavy section 237a. However, the groove passages 237 are independent from one another in the above-described configuration. It is thus possible to easily adjust the pressure loss of fuel gas in each groove passage 237 by differentiating the amplitude A between the upstream portion and the downstream portion of each wavy section 237a.

(9) Each groove passage 237 includes the wavy section 237a, which extends in a wavy shape in planar directions of the contact surface 230a.

With this configuration, the pressure loss of fuel gas is larger in the downstream portion than in the upstream portion in each groove passage 237. This thus further effectively limits reduction in the amount of the fuel gas that permeates into the GDL 212 in the downstream portion of the groove passages 237.

(10) The groove passages 237 are arranged side by side in the third direction Z and include the outer side groove passage 237A, which is located at the outermost position in the third direction Z. The outer side groove passage 237A includes sections that are located outside the outer edge of the contact surface 230a in the third direction Z.

When the pressure loss of fuel gas is different between adjacent groove passages 237, some of the fuel gas flowing through the groove passage 237 in which the pressure loss is larger may permeate into the GDL 212 and flow to the groove passage 237 in which the pressure loss is smaller, as shown in FIG. 11. Such permeation of fuel gas into a section of the GDL 212 between adjacent groove passages 237 also generates power.

However, the outer side groove passage 237A does not have a groove passage 237 on its outer side in the third direction Z. Thus, if the entire outer side groove passage 237A were located inside the contact surface 230a in the third direction Z, it would be difficult to cause fuel gas to permeate into a section of the GDL 212 that is on the outer side of the outer side groove passage 237A by using a difference in the pressure loss of fuel gas described above. This would reduce the power generation efficiency.

In this regard, the above-described configuration reduces the ratio of the section of the GDL 212 that is located on the outer side of the outer side groove passage 237A. This allows fuel gas to permeate into a wider area of the GDL 212. The power generation efficiency is therefore improved.

<Modifications>

The second embodiment may be modified as follows. The second embodiment and the following modifications can be combined as long as the combined modifications remain technically consistent with each other.

The shapes of the inlet holes 291, 293, 295 and the outlet holes 292, 294, 296 are not limited to a rectangular shape in plan view as in the second embodiment. For example, the shapes of the inlet holes 291, 293, 295 and the outlet holes 292, 294, 296 may be square or stadium-shaped in plan view.

The flows of the reactant gas through the holes 291, 292, 293, 294, 295, 296 are not limited to those described in the second embodiment. For example, the hole 296 may be used as an outlet hole for oxidant gas, and the hole 295 may be used as an outlet hole for the oxidant gas. Accordingly, the hole 294 may be used as an inlet hole for cooling medium, and the hole 293 may be used as the outlet hole for the cooling medium. That is, the oxidant gas that flows through the groove passages 247 and the cooling medium that flows through the groove passages 238, 248 may flow in the same direction as the fuel gas flowing through the groove passages 237.

The number of the groove passages 237 is not limited to six as described in the second embodiment, but may be less than or greater than six.

Figure 12:
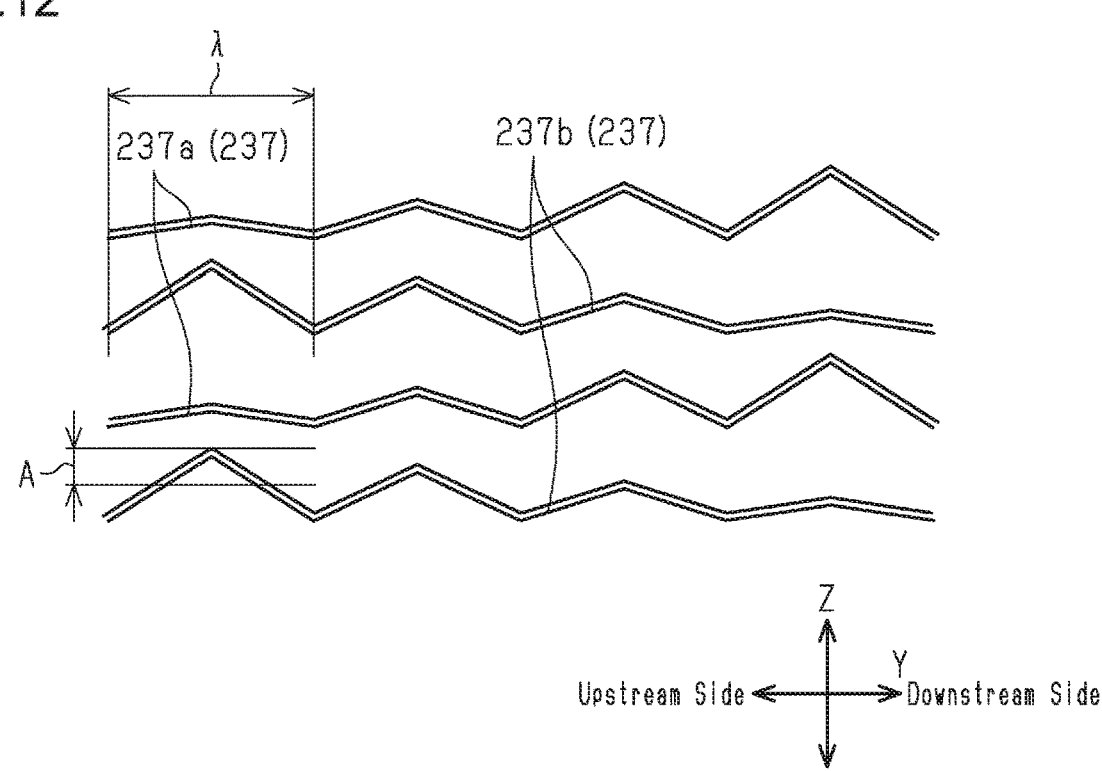
FIG. 12 is a plan view showing groove passages according to a modification.

The separator 230 does not necessarily need to be configured such that the wavy sections 237a have the same shape as described in the second embodiment. For example, as shown in FIG. 12, the separator 230 may be configured such that groove passages 237 including wavy sections 237b and the groove passages 237 including the wavy sections 237a are arranged side by side alternately in the third direction Z. The wavy sections 237b extend in wavy shapes in planar directions of the contact surface 230a. The wavelength λ of each wavy section 237b is constant over the entire wavy section 237b in the extending direction. The amplitude A of each wavy section 237b decreases toward the downstream end. The amplitude A of each wavy section 237b in the upstream portion is larger than the amplitude A of each wavy section 237a in the upstream portion. The amplitude A of each wavy section 237b in the downstream portion is smaller than the amplitude A of each wavy section 237a in the downstream portion.

With this configuration, the pressure loss of fuel gas is different between adjacent groove passages 237. Thus, in the upstream portion, some of the fuel gas flowing through the wavy section 237b of the groove passage 237 in which the pressure loss is relatively large permeates into the GDL 212 and flows to the wavy section 237a of the groove passage 237 in which the pressure loss is relatively small. Also, in the downstream portion, some of the fuel gas flowing through the wavy section 237a of the groove passage 237 in which the pressure loss is relatively large permeates into the GDL 212 and flows to the wavy section 237b of the groove passage 237 in which the pressure loss is relatively small. Such permeation of fuel gas into a section of the GDL 212 between adjacent groove passages 237 also generates power. Accordingly, the power generation efficiency of the fuel cell is increased.

The width, that is, the cross-sectional flow area of each groove passage 237 does not necessarily need to be constant over the entire groove passage 237 in the extending direction, as long as the operation and the advantages of the present disclosure are achieved.

The groove passages 237 do not necessarily need to be configured such that the wavelength λ of each wavy section 237a is constant over the entire wavy section 237a in the extending direction.

The groove passages 237 do not necessarily need to be configured such that the outer side groove passage 237A includes sections that are located outside the outer edge of the contact surface 230a in the third direction Z as described in the second embodiment. For example, the outer side groove passage 237A may be located at the same position as or on the inner side of the outer edge of the contact surface 230a in the third direction Z.

The groove passages 237 do not necessarily need to extend in wavy shapes in planar directions of the contact surface 230a. That is, not all the groove passages 237 need to have the wavy section 237a, but it suffices if at least one of the groove passages 237 has the wavy section 237a.

The groove passages 237 do not necessarily need to be independent from one another as described in the second embodiment. For example, two of the groove passages 237 adjacent to each other may be connected to each other by another passage that extends in the third direction Z.

Figure 13:
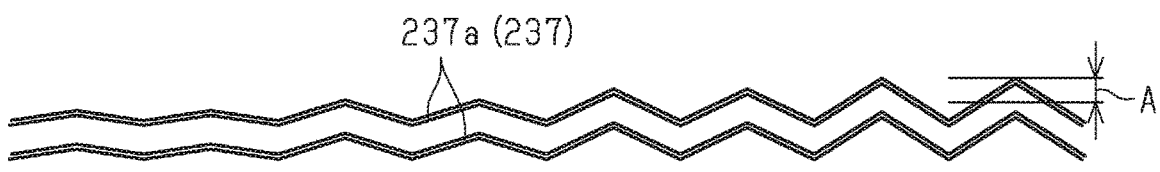
FIG. 13 is a plan view showing groove passages according to a modification.
Figure 13:
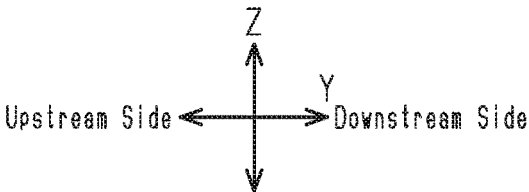

The amplitude A of the wavy section 237a of each groove passage 237 does not necessarily need to differ from one wave to another as described in the second embodiment. For example, as shown in FIG. 13, each set of a fixed even number of waves (two in the example of FIG. 13) may have a larger amplitude A than the other set of the fixed even number of waves on the upstream side. Alternatively, each set of a fixed odd number of waves may have a larger amplitude A than the other set of the fixed odd number of waves on the upstream side. Further, each set of a fixed even or odd number of waves may have a larger amplitude A than the other set of the fixed even or odd number of waves on the upstream side.

Figure 14:
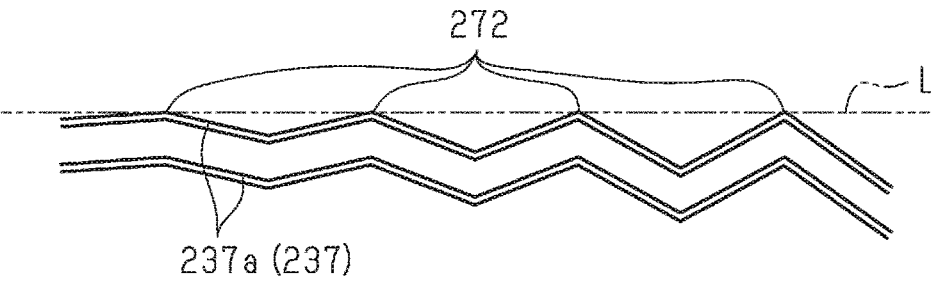
FIG. 14 is a plan view showing groove passages according to a modification.
Figure 14:
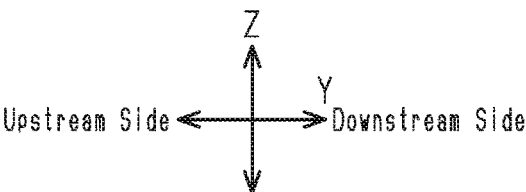
Figure 15:
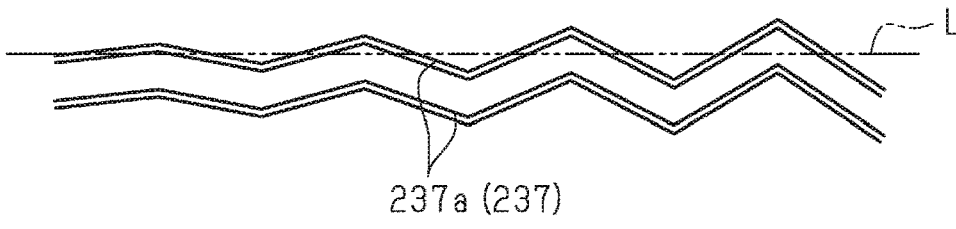
FIG. 15 is a plan view showing groove passages according to a modification.
Figure 15:
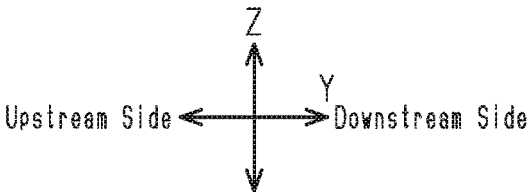

The troughs 271 of the wavy section 237a of each groove passage 237 do not necessarily need to be located on the axis L along the second direction Y as described in the second embodiment. For example, as shown in FIG. 14, each wavy section 237a may include crests 272, which are located on the axis L. Alternatively, as shown in FIG. 15, each wavy section 237a may extend in a wavy shape with the axis L extending through the center.

The separator for a fuel cell according to the present disclosure is not limited to the separator 230, which is joined to the side of the MEA 210 that corresponds to the anode 211B as described in the second embodiment, but may be employed in the separator 240, which is joined to the side corresponding to the cathode 211A.

The separators 230, 240 do not necessarily need to be formed by pressing a metal member, but may be formed by cutting or etching.

The material for the separators 230, 240 are not limited to titanium or stainless steel, but may be aluminum or carbon.

Third Embodiment

A separator for a fuel cell according to a third embodiment will now be described with reference to FIGS. 16 to 18.
<Overall Configuration of Single Cell of Fuel Cell Stack>

Figure 16:
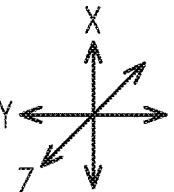
FIG. 16 is an exploded perspective view showing a single cell of a fuel cell.

As shown in FIG. 16, a single cell for a fuel cell stack includes a membrane electrode assembly 310 (hereinafter, referred to as MEA 310), a frame member 320, which supports the MEA 310, and two separators 330, 340, which hold the MEA 310 and the frame member 320 between them.

The single cell is a rectangular plate as a whole.

In the following description, the direction in which the separator 330, the layer including the MEA 310 and the frame member 320, and the separator 340 are stacked will be referred to as a first direction X.

A longitudinal direction of the single cell, which is orthogonal to the first direction X, will be referred to as a second direction Y.

Also, a direction that is orthogonal to both of the first direction X and the second direction Y will be referred to as a third direction Z.

The single cell has inlet holes 391, 393, 395 for introducing reactant gas or cooling medium into the single cell and outlet holes 392, 394, 396 for discharging the reactant gas and the cooling medium in the single cell to the outside. In the present embodiment, the inlet hole 391 and the outlet hole 392 are holes through which fuel gas flows. The inlet hole 393 and the outlet hole 394 are holes through which cooling medium flows. The inlet hole 395 and the outlet hole 396 are holes through which oxidant gas flows. The fuel gas is hydrogen gas. The cooling medium is water. The oxidant gas is air.

The inlet holes 391, 393, 395 and the outlet holes 392, 394, 396 each have a rectangular shape elongated in the second direction Y in plan view, and extend in the first direction X through the single cell. The inlet hole 391 and the outlet holes 394, 396 are located on one side in the second direction Y of the single cell (on the left side in the left-right direction in FIG. 16). The inlet hole 391 and the outlet holes 394, 396 are arranged side by side in the third direction Z while being spaced apart from each other. The outlet hole 392 and the inlet holes 393, 395 are located on the other side in the second direction Y (on the right side in FIG. 16). The outlet hole 392 and the inlet holes 393, 395 are arranged side by side in the third direction Z while being spaced apart from each other.
<MEA 310>

As shown in FIG. 16, the MEA 310 has a rectangular shape elongated in the second direction Y.

The MEA 310 includes a solid polymer electrolyte membrane (not shown; hereinafter referred to as an electrolyte membrane) and electrodes 311A, 311B respectively provided on opposite surfaces of the electrolyte membrane. In the present embodiment, the electrode that is joined to one side in the first direction X (the upper side in the up-down direction in FIG. 16) of the electrolyte membrane (not shown) is a cathode 311A. Also, the electrode joined to the other side in the first direction X (the lower side in the in FIG. 16) of the electrolyte membrane is an anode 311B.

The electrodes 311A, 311B each include a catalyst layer (not shown) joined to the electrolyte membrane and a gas diffusion layer 312 (hereinafter referred to as a GDL 312), which is joined to the catalyst layer.

The MEA 310 corresponds to a power generating unit of the fuel cell according to the present disclosure.
<Frame Member 320>

As shown in FIG. 16, the frame member 320 has a rectangular shape elongated in the second direction Y.

The frame member 320 is made of, for example, a hard plastic.

The frame member 320 includes through-holes 321, 322, 323, 324, 325, 326, which are respectively part of the holes 391, 392, 393, 394, 395, 396.

The frame member 320 includes an opening 327, which has a rectangular shape elongated in the second direction Y, in a center. The MEA 310 is joined to the edge of the opening 327 from one side in the first direction X (upper side as viewed in FIG. 16).

<Separator 330>

As shown in FIG. 16, the separator 330 is a rectangular plate elongated in the second direction Y.

The separator 330 is formed by pressing, for example, a metal member made of titanium or stainless steel.

The separator 330 is provided on the side of the MEA 310 on which the anode 311B is provided. The separator 330 includes a first surface 330A and a second surface 330B, which is on a side opposite to the first surface 330A. The first surface 330A includes a contact surface 330*a*, which contacts the MEA 310 (refer to FIG. 17).

The separator 330 includes through-holes 331, 332, 333, 334, 335, 336, which are respectively part of the holes 391, 392, 393, 394, 395, 396. In the third direction Z, the through-holes 331, 334, 336 are provided at positions that correspond to the through-holes 321, 324, 326 of the frame member 320. Also, in the third direction Z, the through-holes 332, 333, 335 are provided at positions that correspond to the through-holes 322, 323, 325 of the frame member 320.

The separator 330 includes groove passages 337 through which fuel gas flows and groove passages 338 through which cooling medium flows. FIG. 16 illustrates, in a simplified manner, the outer edge of a section in the separator 330 that includes the groove passages 337 and the outer edge of a section in the separator 330 that includes the groove passages 338.

<Groove Passages 337, 338>

Figure 17:
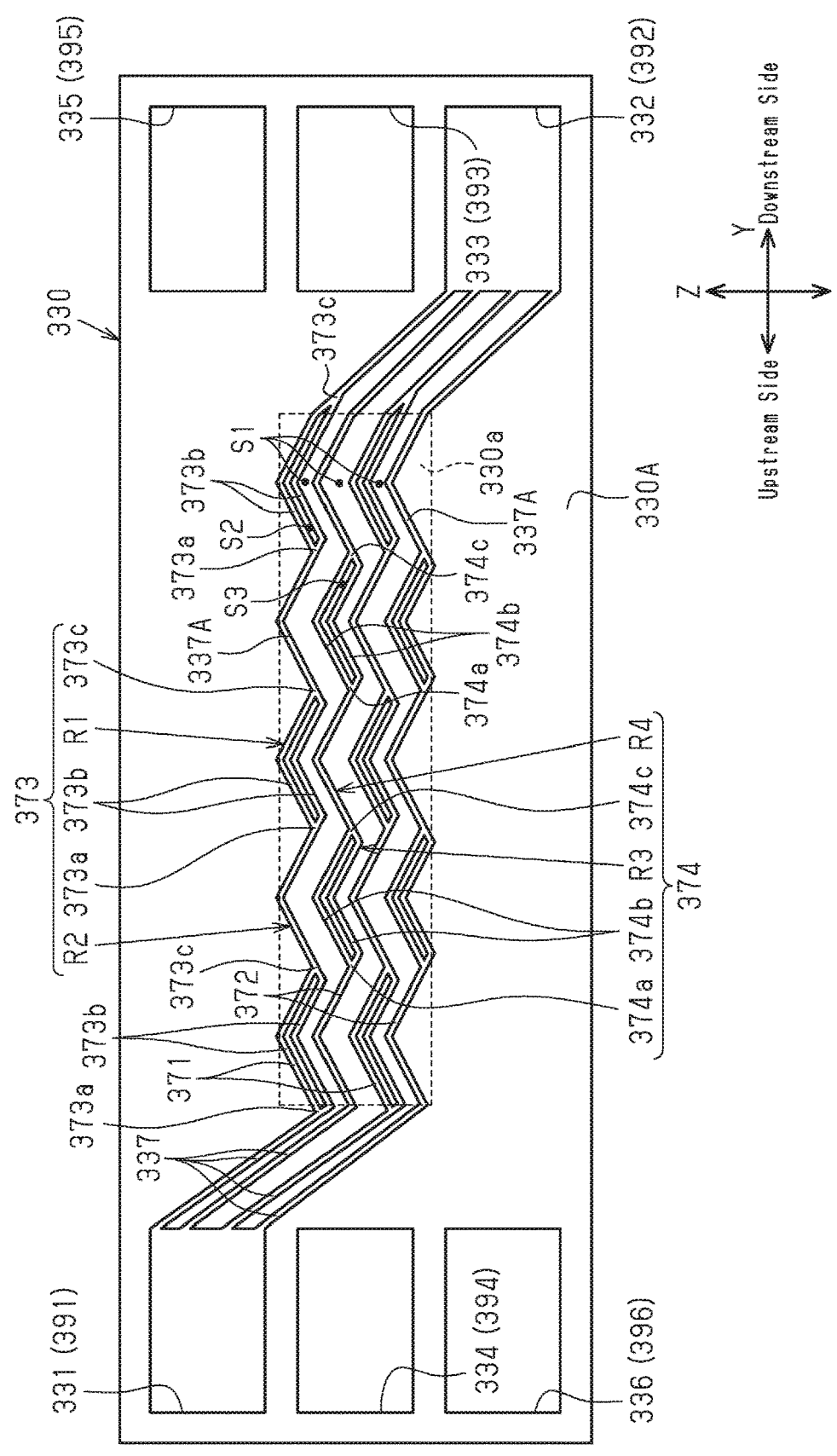
FIG. 17 is a plan view of a separator for a fuel cell according to a third embodiment that is used in the single cell shown in FIG. 16 and includes groove passages arranged side by side, through which fuel gas flows.

As shown in FIG. 17, the groove passages 337 connect the through-hole 331 and the through-hole 332 to each other. The groove passages 337 are provided in the first surface 330A. In the present embodiment, the groove passages 337, of which there are four, are arranged side by side in the third direction Z while being spaced apart at an interval S1. That is, the four groove passages 337 are independent from one another.

The width, that is, the cross-sectional flow area of each groove passage 337 is constant over the entire groove passage 337 in the extending direction. The groove passages 337 have the same width.

The groove passages 337 include first groove passages 371 and second groove passages 372, which are adjacent to each other in the third direction Z. In the present embodiment, the number of the first groove passages 371 and the number of the second groove passages 372 are respectively two. The first groove passages 371 and the second groove passages 372 are arranged side by side alternately in the third direction Z.

In the following description, an upstream portion and a downstream portion in the flow direction of fuel gas in the groove passages 337 will simply be referred to as an upstream portion and a downstream portion, respectively. The number of passages arranged in the third direction Z in each first groove passage 371 will be referred to as a first passage count N1. The number of passages arranged in the third direction Z in each second groove passage 372 will be referred to as a second passage count N2.

Each first groove passage 371 includes a wavy section 373. The wavy sections 373 are provided in the contact surface 330*a* and extend in wavy shapes in planar directions of the contact surface 330*a*.

The wavy sections 373 include branching portions 373*a*, branched passages 373*b*, which are branched toward the downstream end from each branching portion 373*a*, and merging portions 373*c* at which branched passages 373*b* merge.

Each wavy section 373 includes three of the branching portions 373*a* and three of the merging portions 373*c*. The branching portions 373*a* and the merging portions 373*c* are arranged side by side alternately in the extending direction of the wavy section 373. In the present embodiment, one of the three branching portions 373*a* is located at the upstream end of each wavy section 373. Also, one of the three merging portions 373*c* is located at the downstream end of each wavy section 373.

Two of the branched passages 373*b* are branched into two toward the downstream end from each branching portion 373*a*. The two branched passages 373*b* merge at each merging portion 373*c*. The branched passages 373*b* are independent from each other at positions other than the branching portion 373*a* and the merging portion 373*c*. Specifically, the branched passages 373*b* are arranged side by side in the third direction Z with an interval S2 between them. The interval S2 is smaller than the interval S1.

Each wavy section 373 includes first parts R1 and second parts R2, of which the first passage count N1 is less than that of the first parts R1. In the present embodiment, each first part R1 is located between one of the branching portions 373*a* and one of the merging portions 373*c* that is located downstream of and adjacent to the branching portion 373*a*. Each second part R2 is located between one of the merging portions 373*c* and the one of the branching portions 373*a* that is located downstream of and adjacent to the merging portion 373*c*. That is, the second parts R2 are parts of the wavy section 373 except for the first parts R1, the branching portions 373*a*, and the merging portions 373*c*. The first passage count N1 of each first part R1 is two, and the first passage count N1 of each second part R2 is one.

Each second groove passage 372 includes a wavy section 374. The wavy sections 374 are provided in the contact surface 330*a* and extend in wavy shapes in planar directions of the contact surface 330*a*.

The wavy sections 374 include branching portions 374*a*, branched passages 374*b*, which are branched toward the downstream end from each branching portion 374*a*, and merging portions 374*c* at which branched passages 374*b* merge.

Each wavy section 374 includes two of the branching portions 374*a* and two of the merging portions 374*c*. The branching portions 374*a* and the merging portions 374*c* are arranged side by side alternately in the extending direction of the wavy section 374.

Two of the branched passages 374*b* are branched toward the downstream end from each branching portion 374*a*. The two branched passages 374*b* merge at each merging portion 374*c*. The branched passages 374*b* are independent from each other at positions other than the branching portion 374*a* and the merging portion 374*c*. Specifically, the branched passages 374*b* are arranged side by side in the third direction Z with an interval S3 between them. The interval S3 is smaller than the interval S1. In the present embodiment, the interval S3 has the same width as the interval S2.

Each wavy section 374 includes third parts R3 and fourth parts R4, of which the first passage count N1 is less than that of the third parts R3. In the present embodiment, each third part R3 is located between one of the branching portions 374*a* and the one of the merging portions 374*c* that is located downstream of and adjacent to the branching portion 374*a*. Each fourth part R4 is located between one of the merging portions 374*c* and the one of the branching portions 374*a* that is located downstream of and adjacent to the merging portion 374c. One of the fourth parts R4 is located in the upstream portion of the most upstream branching portion 374a, and another fourth part R4 is located in the downstream portion of the most downstream merging portion 374c. That is, the fourth parts R4 are parts of the wavy section 374 except for the third parts R3, the branching portions 374a, and the merging portions 374c. The second passage count N2 of each third part R3 is two, and the second passage count N2 of each fourth part R4 is one.

Each third part R3 of the second groove passage 372 is adjacent to one of the second parts R2 of the first groove passage 371 in the third direction Z. More specifically, the entire third part R3 is adjacent to the entire second part R2 in the third direction Z.

Each fourth part R4 of the second groove passage 372 is adjacent to one of the first parts R1 of the first groove passage 371 in the third direction Z. More specifically, the entire fourth part R4 is adjacent to the entire first part R1 in the third direction Z.

Figure 18:
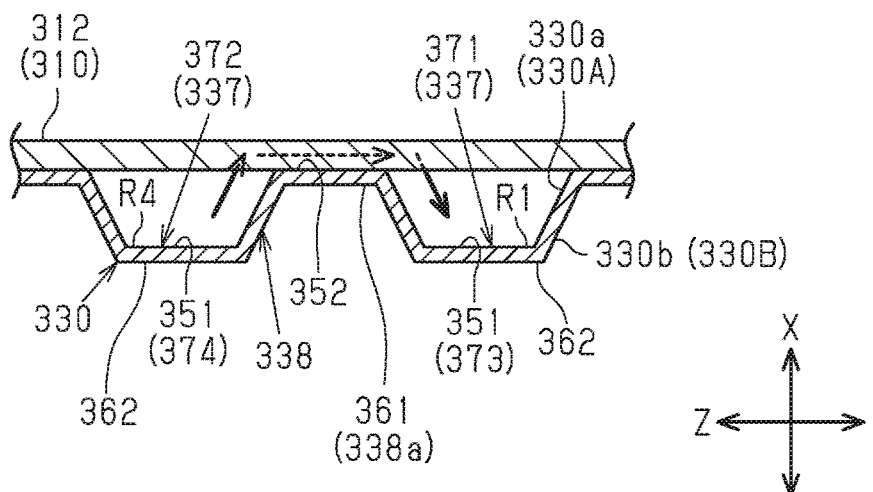
FIG. 18 is a cross-sectional view illustrating a flow of fuel gas that permeates into the gas diffusion layer from a groove passage shown in FIG. 17.

As shown in FIG. 18, the wavy sections 373, 374 include recesses 351 formed in the first surface 330A of the separator 330. Ribs 352, which are protrusions, are provided between the recesses 351. The protruding ends of the ribs 352 are in contact with the GDL 312 of the MEA 310, which is adjacent to the separator 330.

As shown in FIG. 17, the groove passages 337 include an outer side groove passage 337A, which is located at the outermost position in the third direction Z. The outer side groove passage 337A includes sections that are located outside the outer edge of the contact surface 330a in the third direction Z.

As shown in FIG. 16, the groove passages 338 connect the through-hole 333 and the through-hole 334 to each other. The groove passages 338 are provided in the second surface 330B. In the groove passages 338, cooling medium flows in a direction opposite to the flowing direction of the fuel gas flowing through the groove passages 337.

As shown in FIG. 18, the groove passages 338 include wavy sections 338a. The wavy sections 338a are provided in a surface 330b on a side opposite to the contact surface 330a and extend in wavy shapes in planar directions of the surface 330b. The wavy sections 338a include recesses 361 formed in the second surface 330B of the separator 330. Ribs 362, which are protrusions, are provided between the recesses 361. The back side of each rib 362 is the recess 351 that forms the wavy sections 373, 374 of each groove passage 337. Likewise, the back side of each rib 352 is the recess 361 that forms the wavy section 338a of each groove passage 338. That is, the shapes of protrusions and recesses of the wavy sections 338a in the groove passages 338 and the shapes of recesses and protrusions of the wavy sections 373, 374 in the groove passages 337 conform to each other.

<Separator 340>

As shown in FIG. 16, the separator 340 is a rectangular plate elongated in the second direction Y.

The separator 340 is formed by pressing, for example, a metal member made of titanium or stainless steel.

The separator 340 is provided on the side of the MEA 310 on which the cathode 311A is provided. The separator 340 includes a first surface 340A and a second surface 340B, which is on a side opposite to the first surface 340A. The first surface 340A includes a contact surface, which contacts the MEA 310.

The separator 340 includes through-holes 341, 342, 343, 344, 345, 346, which are respectively part of the holes 391, 392, 393, 394, 395, 396. In the third direction Z, the through-holes 341, 344, 346 are provided at positions that correspond to the through-holes 321, 324, 326 of the frame member 320. Also, in the third direction Z, the through-holes 342, 343, 345 are provided at positions that correspond to the through-holes 322, 323, 325 of the frame member 320.

As shown in FIG. 16, the separator 340 includes groove passages 347 through which oxidant gas flows and groove passages 348 through which cooling medium flows. FIG. 16 illustrates, in a simplified manner, the outer edge of a section in the separator 340 that includes the groove passages 347 and the outer edge of a section in the separator 340 that includes the groove passages 348.

The groove passages 347 connect the through-hole 345 and the through-hole 346 to each other. In the groove passages 347, the oxidant gas flows in a direction opposite to the flowing direction of the fuel gas flowing through the groove passages 337.

The groove passages 348 connect the through-hole 343 and the through-hole 344 to each other. In the groove passages 348, the cooling medium flows in the same as the flowing direction of the oxidant gas flowing through the groove passages 347.

Operation of the third embodiment will now be described.

Arrows in FIG. 18 indicate the flow of fuel gas that permeates into the GDL 312 from the groove passages 337.

When the groove passages 337 have branched passages 373b (374b) that are arranged side by side in the third direction Z as shown in FIG. 18, the pressure loss of the fuel gas is larger in regions where the number of passages arranged in the third direction Z is small than in regions where the number of passage is large.

According to the configuration of the third embodiment, there is a difference in the pressure loss of fuel gas between each first part R1 of the first groove passage 371 and the fourth part R4 of the second groove passage 372 that is adjacent to the first part RE Thus, some of the fuel gas that is flowing through the fourth part R4, which has a larger pressure loss than the first part R1, permeates into the GDL 312 and flows to the first part R1, which has a smaller pressure loss than the fourth part R4.

Also, there is a difference in the pressure loss of fuel gas between each second part R2 of the first groove passage 371 and the third part R3 of the second groove passage 372 that is adjacent to the second part R2. Thus, some of the fuel gas that is flowing through the second part R2, which has a larger pressure loss than the third part R3, permeates into the GDL 312 and flows to the third part R3, which has a smaller pressure loss than the second part R2.

The third embodiment has the following advantages.

(11) The groove passages 337 include the first groove passages 371 and the second groove passages 372, which extend in wavy shapes in planar directions of the contact surface 330a and are adjacent to each other in the third direction Z. Each first groove passage 371 includes the branched passages 373b, which are arranged side by side in the third direction Z. Each second groove passage 372 includes the branched passages 374b, which are arranged side by side in the third direction Z. The first passage count N1 of each first part R1 of the first groove passage 371 is different from the second passage count N2 of the fourth part R4 of the second groove passage 372 that is adjacent to the first part RE Also, the first passage count N1 of each second part R2 of the first groove passage 371 is different from the second passage count N2 of the third part R3 of the second groove passage 372 that is adjacent to the second part R2.

This configuration operates in the above-described manner. Accordingly, fuel gas permeates into a wider area in the GDL 312. This increases power generation in a wider area in the GDL 312. Accordingly, the power generation efficiency of the fuel cell is increased.

(12) In each second groove passage 372, the second passage count N2 of each fourth part R4, which is adjacent to a first part R1, is less than the first passage count N1 of the particular first part RE In the second groove passage 372, the second passage count N2 of each third part R3, which is adjacent to a second part R2, is more than the first passage count N1 of the second part R2.

For example, if the first passage count N1 of each wavy section 373 is less than, over the entire wavy section 373 in the extending direction, the second passage count N2 of each wavy section 374, the following problems may occur. The fuel gas flowing through each first groove passage 371 would flow into the corresponding second groove passage 372 via the GDL 312 over the entire length in the extending direction. This would reduce the amount of fuel gas that permeates into the GDL 312 in the downstream portion of the flow of fuel gas in the first groove passage 371. This may reduce power generation in the downstream portion.

However, in the above-described configuration, the fuel gas flowing through the fourth part R4 of each second groove passage 372 that is adjacent to a first part R1 flows to the first part R1 via the GDL 312. On the other hand, the fuel gas flowing through each second part R2 flows to a third part R3 of the second groove passage 372 that is adjacent to the second part R2 via the GDL 312. This prevents the flow of fuel gas that permeates into the GDL 312 from the groove passage 337 from being concentrated either in the first groove passage 371 or in the second groove passage 372. This limits reduction in the amount of fuel gas that permeates into the GDL 312 in the downstream portion of one of the first groove passage 371 and the second groove passage 372.

(13) The interval S2 (S3) between the branched passages 373*b* (374*b*) in the third direction Z is smaller than the interval S1 between the first groove passage 371 and the second groove passage 372.

The fuel gas flowing through one of the adjacent branched passages 373*b* (374*b*) may permeate into the GDL 312 and flow to the other one of branched passages 373*b* (374*b*). The wider the interval S2 (S3) between the branched passages 373*b* (374*b*), the less likely that the fuel gas will permeate into a section of the GDL 312 located between the branched passages 373*b* (374*b*). However, the interval S2 (S3) between the branched passages 373*b* (374*b*) is relatively small in the above-described configuration. This allows fuel gas to easily permeate into that particular section of the GDL 312. The power generation efficiency is therefore prevented from decreasing.

(14) The first groove passages 371 and the second groove passages 372 are independent from each other.

For example, if the first groove passage 371 and the second groove passage 372 were connected to each other, the dynamic pressure of fuel gas flowing through the groove passages 371, 372 would be equalized at the connected sections. It thus would be difficult to adjust the pressure loss of fuel gas by differentiating the numbers of passages between predetermined sections of the first groove passage 371 and the second groove passage 372. However, the first groove passages 371 and the second groove passages 372 are independent from each other in the above-described configuration. Accordingly, it is easy to adjust the pressure loss of fuel gas in the first groove passage 371 and the second groove passage 372.

(15) The first groove passages 371 and the second groove passages 372 are arranged alternately in the third direction Z.

This configuration generates, in each of the groove passages 371, 372, flow of fuel gas between each of the groove passages 371 (372) and the adjacent groove passages 372 (371) via the GDL 312. Accordingly, fuel gas permeates into a wider area in the GDL 312.

(16) The groove passages 337 include the outer side groove passage 337A, which is located at the outermost position in the third direction Z. The outer side groove passage 337A includes sections that are located outside the outer edge of the contact surface 330*a* in the third direction Z.

The outer side groove passage 337A does not have a groove passage 337 on its outer side in the third direction Z. Thus, if the entire outer side groove passage 337A were located inside the contact surface 330*a* in the third direction Z, it would be difficult to cause fuel gas to permeate into a section of the GDL 312 that is on the outer side of the outer side groove passage 337A by using a difference in the pressure loss of fuel gas described above. This would reduce the power generation efficiency.

In this regard, the above-described configuration reduces the ratio of the section of the GDL 312 that is located on the outer side of the outer side groove passage 337A. This allows fuel gas to permeate into a wider area of the GDL 312. The power generation efficiency is therefore improved.

<Modifications>

The third embodiments may be modified as follows. The third embodiment and the following modifications can be combined as long as the combined modifications remain technically consistent with each other.

The shapes of the inlet holes 391, 393, 395 and the outlet holes 392, 394, 396 are not limited to a rectangular shape in plan view as in the third embodiment. For example, the shapes of the inlet holes 391, 393, 395 and the outlet holes 392, 394, 396 may be square or stadium-shaped in plan view.

The flows of the reactant gas through the holes 391, 392, 393, 394, 395, 396 are not limited to those described in the third embodiment. For example, the hole 396 may be used as an outlet hole for oxidant gas, and the hole 395 may be used as an outlet hole for the oxidant gas. Accordingly, the hole 394 may be used as an inlet hole for cooling medium, and the hole 393 may be used as the outlet hole for the cooling medium. That is, the oxidant gas that flows through the groove passages 347 and the cooling medium that flows through the groove passages 338, 348 may flow in the same direction as the fuel gas flowing through the groove passages 337.

The number of the groove passages 337 is not limited to four as described in the third embodiment, but may be less than or greater than four.

The width, that is, the cross-sectional flow area of each groove passage 337 does not necessarily need to be constant over the entire groove passage 337 in the extending direction, as long as the operation and the advantages of the present disclosure are achieved.

The groove passages 337 do not necessarily need to be configured such that the outer side groove passage 337A includes sections that are located outside the outer edge of the contact surface 330*a* in the third direction Z as described in the third embodiment. For example, the outer side groove passage 337A may be located at the same position as or on the inner side of the outer edge of the contact surface 330*a* in the third direction Z.

The groove passages 337 do not necessarily need to include the first groove passages 371 and the second groove passages 372, which are arranged side by side alternately in the third direction Z, as described in the third embodiment. For example, the groove passages 337 may include one first groove passage 371 and one second groove passage 372.

The first groove passages 371 and the second groove passages 372 do not necessarily need to be independent from each other as described in the third embodiment. For example, the first groove passage 371 and the second groove passage 372 may be connected to each other by another groove passage that extends in the third direction Z.

The widths of the interval S2 between the branched passages 373b and the interval S3 between the branched passages 374b are not limited to those described in the third embodiment. For example, the width of at least one of the interval S2 and the interval S3 may be larger than or equal to the interval S1 between the first groove passage 371 and the second groove passage 372.

The two branched passages 373b do not necessarily need to be independent from each other at positions other than the branching portion 373a and the merging portion 373c as described in the third embodiment. For example, the branched passages 373b may be connected to each other by another groove passage that extends in the third direction Z.

The two branched passages 374b do not necessarily need to be independent from each other at positions other than the branching portion 374a and the merging portion 374c as described in the third embodiment. For example, the branched passages 374b may be connected to each other by another groove passage that extends in the third direction Z.

The second passage count N2 of the third part R3 in the second groove passage 372 is not limited to the number described in the third embodiment. That is, the third part R3 does not necessarily need to include two branched passages 374b arranged side by side in the third direction Z, but may include three or more branched passages 374b arranged side by side in the third direction Z. In this case, three or more branched passages 374b are branched from the branching portion 374a, and the branched passages 374b merge at the merging portion 374c. Also, in this case, the first passage count N1 of the second part R2 in the first groove passage 371 is not limited to one, but may be changed to any number as long as the number is less than the second passage count N2 of the third part R3.

The first passage count N1 of the first part R1 in the first groove passage 371 is not limited to the number described in the third embodiment. That is, the first part R1 does not necessarily need to include two branched passages 373b arranged side by side in the third direction Z, but may include three or more branched passages 373b arranged side by side in the third direction Z. In this case, three or more branched passages 373b are branched from the branching portion 373a, and the branched passages 373b merge at the merging portion 373c. Also, in this case, the second passage count N2 of the fourth part R4 in the second groove passage 372 is not limited to one, but may be changed to any number as long as the number is less than the first passage count N1 of the first part R1.

Figure 19:
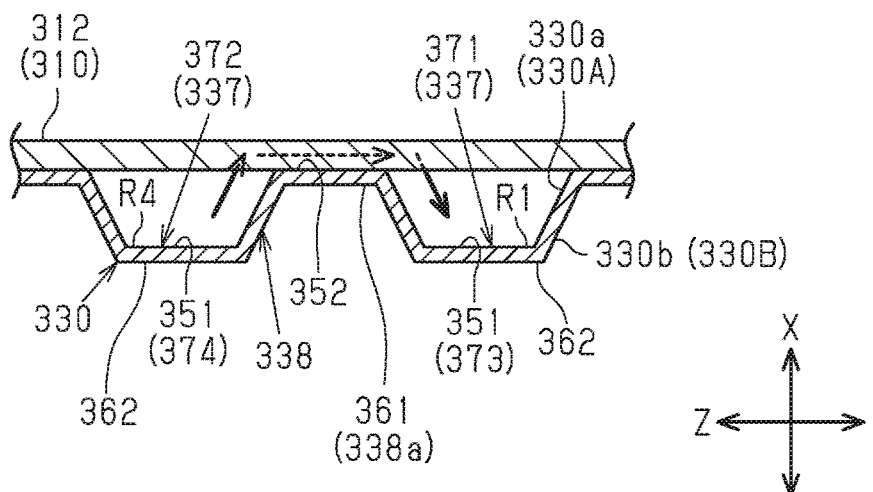
FIG. 19 is a plan view showing groove passages according to a modification.

The shape of the wavy section 374 of the second groove passage 372 may be changed in the following manner. The amplitude, the wavelength, and the wavenumber of the wavy section 374 may be changed within ranges that ensure the operation of the third embodiment, as long as the second passage count N2 of a section adjacent to the first part R1 is less than the first passage count N1 of the first part R1, and the second passage count N2 of a section adjacent to the second part R2 is larger than the first passage count N1 of the second part R2. For example, the wavenumbers of the third part R3 and the fourth part R4 may be more than one as shown in FIG. 19. In accordance with this modification, the arrangement and the numbers of the branching portions 374a and the merging portions 374c may be changed. For example, the merging portions 374c may be omitted.

The branching portions 374a and the branched passages 374b may be omitted from each second groove passage 372.

The shape of the wavy section 373 of the first groove passage 371 may be changed in the following manner. The amplitude, the wavelength, and the wavenumber of the wavy section 373 may be changed within ranges that ensure the operation of the third embodiment. For example, the wavenumbers of the first part R1 and the second part R2 may be more than one as shown in FIG. 19. In accordance with this modification, the arrangement and the numbers of the branching portions 373a and the merging portions 373c may be changed. For example, the merging portions 373c may be omitted. These modifications are possible as long as the first passage count N1 of a predetermined section in the wavy section 373 of the first groove passage 371 is different from the second passage count N2 of a section in the wavy section 374 of the second groove passage 372 that is adjacent to the predetermined section.

The separator for a fuel cell according to the present disclosure is not limited to the separator 330, which is joined to the side of the MEA 310 that corresponds to the anode 311B as described in the third embodiment, but may be employed in the separator 340, which is joined to the side corresponding to the cathode 311A.

The separators 330, 340 do not necessarily need to be formed by pressing a metal member, but may be formed by cutting or etching.

The material for the separators 330, 340 are not limited to titanium or stainless steel, but may be aluminum or carbon.

Fourth Embodiment

A separator for a fuel cell according to a fourth embodiment will now be described with reference to FIGS. 20 to 25.
<Overall Configuration of Single Cell of Fuel Cell Stack>

Figure 20:
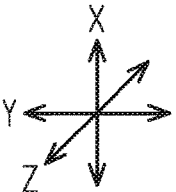
FIG. 20 is an exploded perspective view showing a single cell of a fuel cell.

As shown in FIG. 20, a single cell for a fuel cell stack includes a membrane electrode assembly 410 (hereinafter, referred to as MEA 410), a frame member 420, which supports the MEA 410, and two separators 430, 440, which hold the MEA 410 and the frame member 420 between them.

The single cell is a rectangular plate as a whole.

In the following description, the direction in which the separator 430, the layer including the MEA 410 and the frame member 420, and the separator 440 are stacked will be referred to as a first direction X.

A longitudinal direction of the single cell, which is orthogonal to the first direction X, will be referred to as a second direction Y.

Also, a direction that is orthogonal to both of the first direction X and the second direction Y will be referred to as a third direction Z.

The single cell has inlet holes 491, 493, 495 for introducing reactant gas or cooling medium into the single cell and outlet holes 492, 494, 496 for discharging the reactant gas and the cooling medium in the single cell to the outside. In the present embodiment, the inlet hole 491 and the outlet hole 492 are holes through which fuel gas flows. The inlet hole 493 and the outlet hole 494 are holes through which cooling medium flows. The inlet hole 495 and the outlet hole 496 are holes through which oxidant gas flows. The fuel gas is hydrogen gas. The cooling medium is water. The oxidant gas is air.

The inlet holes 491, 493, 495 and the outlet holes 492, 494, 496 each have a rectangular shape elongated in the second direction Y in plan view, and extend in the first direction X through the single cell. The inlet hole 491 and the outlet holes 494, 496 are located on one side in the second direction Y of the single cell (on the left side in the left-right direction in FIG. 20). The inlet hole 491 and the outlet holes 494, 496 are arranged side by side in the third direction Z while being spaced apart from each other. The outlet hole 492 and the inlet holes 493, 495 are located on the other side in the second direction Y (on the right side in FIG. 20). The outlet hole 492 and the inlet holes 493, 495 are arranged side by side in the third direction Z while being spaced apart from each other.

<MEA 410>

As shown in FIG. 20, the MEA 410 has a rectangular shape elongated in the second direction Y.

The MEA 410 includes a solid polymer electrolyte membrane (not shown; hereinafter referred to as an electrolyte membrane) and electrodes 411A, 411B respectively provided on opposite surfaces of the electrolyte membrane. In the present embodiment, the electrode that is joined to one side in the first direction X (the upper side in the up-down direction in FIG. 20) of the electrolyte membrane (not shown) is a cathode 411A. Also, the electrode joined to the other side in the first direction X (the lower side in the in FIG. 20) of the electrolyte membrane is an anode 411B.

The electrodes 411A, 411B each include a catalyst layer (not shown) joined to the electrolyte membrane and a gas diffusion layer 412 (hereinafter referred to as a GDL 412), which is joined to the catalyst layer.

The MEA 410 corresponds to a power generating unit of the fuel cell according to the present disclosure.

<Frame Member 420>

As shown in FIG. 20, the frame member 420 has a rectangular shape elongated in the second direction Y.

The frame member 420 is made of, for example, a hard plastic.

The frame member 420 includes through-holes 421, 422, 423, 424, 425, 426, which are respectively part of the holes 491, 492, 493, 494, 495, 496.

The frame member 420 includes an opening 427, which has a rectangular shape elongated in the second direction Y, in a center. The MEA 410 is joined to the edge of the opening 427 from one side in the first direction X (upper side as viewed in FIG. 20).

<Separator 430>

As shown in FIG. 20, the separator 430 is a rectangular plate elongated in the second direction Y.

The separator 430 is formed by pressing, for example, a metal member made of titanium or stainless steel.

The separator 430 is provided on the side of the MEA 410 on which the anode 411B is provided. The separator 430 includes a first surface 430A and a second surface 430B, which is on a side opposite to the first surface 430A. The first surface 430A includes a contact surface 430a, which contacts the MEA 410 (refer to FIG. 21).

The separator 430 includes through-holes 431, 432, 433, 434, 435, 436, which are respectively part of the holes 491, 492, 493, 494, 495, 496. In the third direction Z, the through-holes 431, 434, 436 are provided at positions that correspond to the through-holes 421, 424, 426 of the frame member 420. Also, in the third direction Z, the through-holes 432, 433, 435 are provided at positions that correspond to the through-holes 422, 423, 425 of the frame member 420.

The separator 430 includes groove passages 437 through which fuel gas flows and groove passages 438 through which cooling medium flows. FIG. 20 illustrates, in a simplified manner, the outer edge of a section in the separator 430 that includes the groove passages 437 and the outer edge of a section in the separator 430 that includes the groove passages 438.

<Groove Passages 437, 438>

Figure 21:
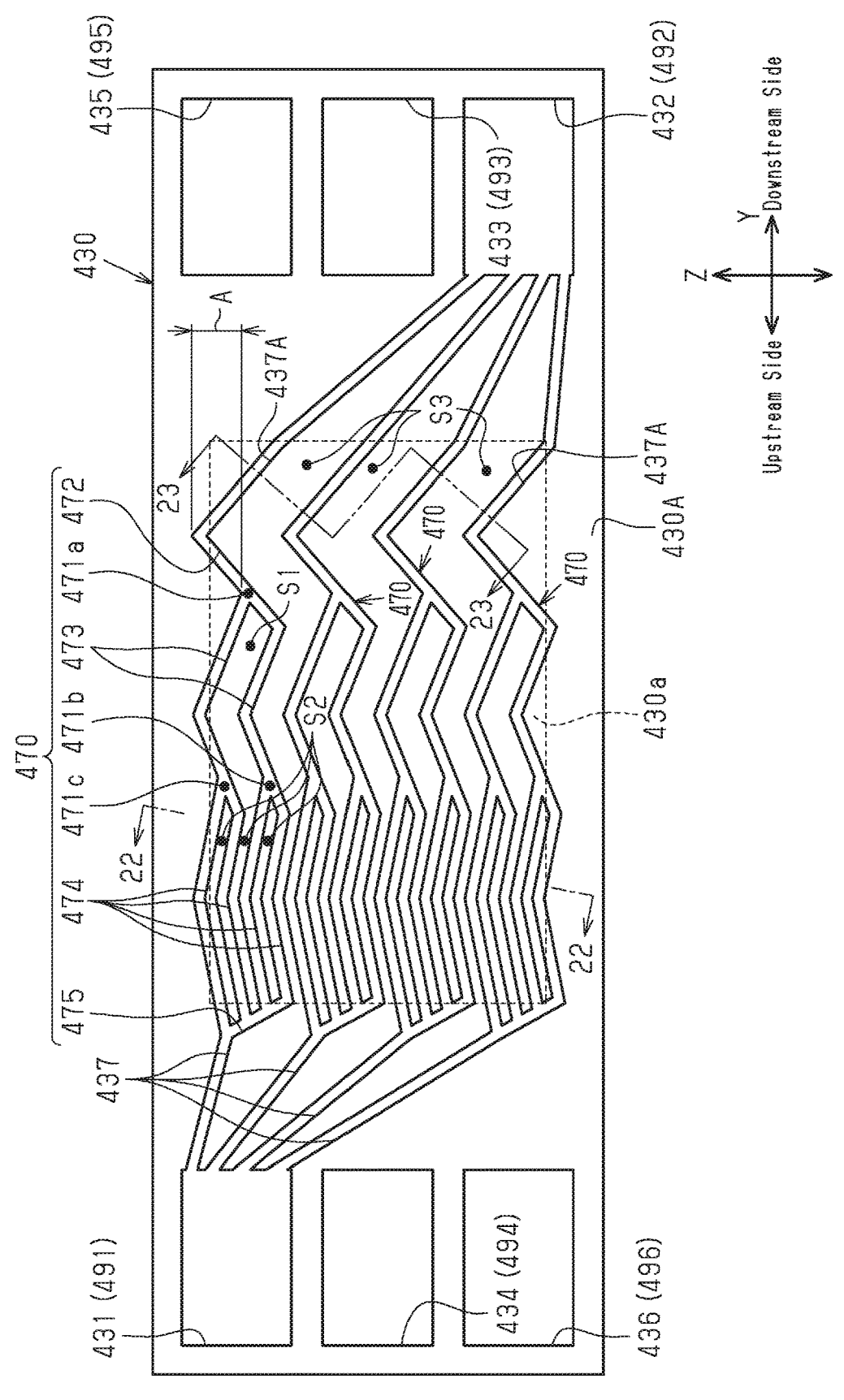
FIG. 21 is a plan view of a separator for a fuel cell according to a fourth embodiment that is used in the single cell shown in FIG. 20 and includes groove passages arranged side by side, through which fuel gas flows.

As shown in FIG. 21, the groove passages 437 connect the through-hole 431 and the through-hole 432 to each other. The groove passages 437 are provided in the first surface 430A. In the present embodiment, the groove passages 437, of which there are four, are arranged side by side in the third direction Z while being spaced apart at an interval. That is, the four groove passages 437 are independent from one another.

In the following description, an upstream portion and a downstream portion in the flow direction of fuel gas in the groove passages 437 will simply be referred to as an upstream portion and a downstream portion, respectively.

The width, that is, the cross-sectional flow area of each groove passage 437 is constant over the entire groove passage 437 in the extending direction. The groove passages 437 have the same width.

As shown in FIG. 21, the groove passages 437 include wavy sections 470. The wavy sections 470 are provided in the contact surface 430a and extend in wavy shapes in planar directions of the contact surface 430a. The amplitude A of each wavy section 470 is larger in the downstream portion than in the upstream portion. Specifically, the amplitude A of each wavy section 470 increases toward the downstream end.

Each wavy section 470 includes merging portions 471a, 471b, 471c.

Each wavy section 470 includes a mainstream passage 472, which is located in the downstream portion of the wavy section 470, first tributary passages 473, which merge into the mainstream passage 472, and second tributary passages 474, which merge into the first tributary passages 473.

The wavy section 470 includes a connecting passage 475, which connect the second tributary passages 474 together in the upstream portion of the wavy section 470.

The merging portion 471a is located at the upstream end of the mainstream passage 472.

The first tributary passages 473 extend from the upstream side toward the merging portion 471a. Specifically, two first tributary passages 473 merge at the merging portion 471a.

The first tributary passages 473 are independent from each other at positions other than the merging portion 471a. Specifically, the first tributary passages 473 are arranged side by side in the third direction Z with an interval S1 between them. The first tributary passages 473 have sections that extend parallel with each other.

The merging portions 471b, 471c are each provided at the upstream ends of two first tributary passages 473. The merging portion 471b and the merging portion 471c are located on the same axis extending in the third direction Z.

The second tributary passages 474 extend from the upstream side toward the merging portions 471b, 471c. Specifically, two adjacent second tributary passages 474 merge into each of the merging portions 471b, 471c.

Figure 22:
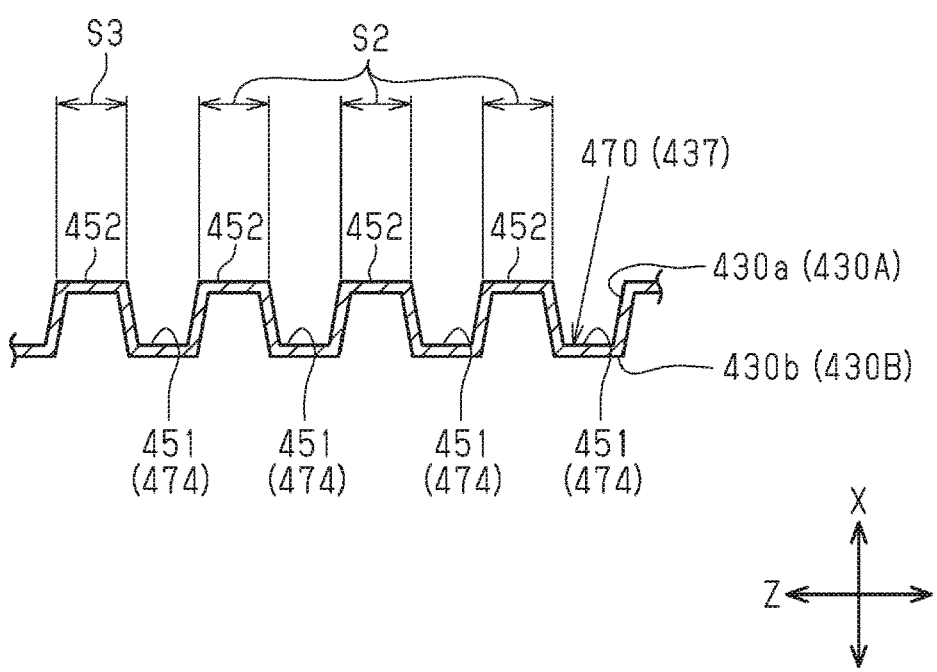
FIG. 22 is a cross-sectional view taken along line 22-22 in FIG. 21.

As shown in FIGS. 21 and 22, four second tributary passages 474 are independent from one another at positions other than the merging portions 471b, 471c. Specifically, the second tributary passages 474 are arranged side by side in the third direction Z with an interval S2 between them. The second tributary passages 474 have sections that extend parallel with each other.

The four groove passages 437 each include a wavy section 470. The wavy sections 470 of the groove passages 437 have the same shape. The wavy sections 470 of the groove passages 437 have sections that extend parallel with each other.

Figure 23:
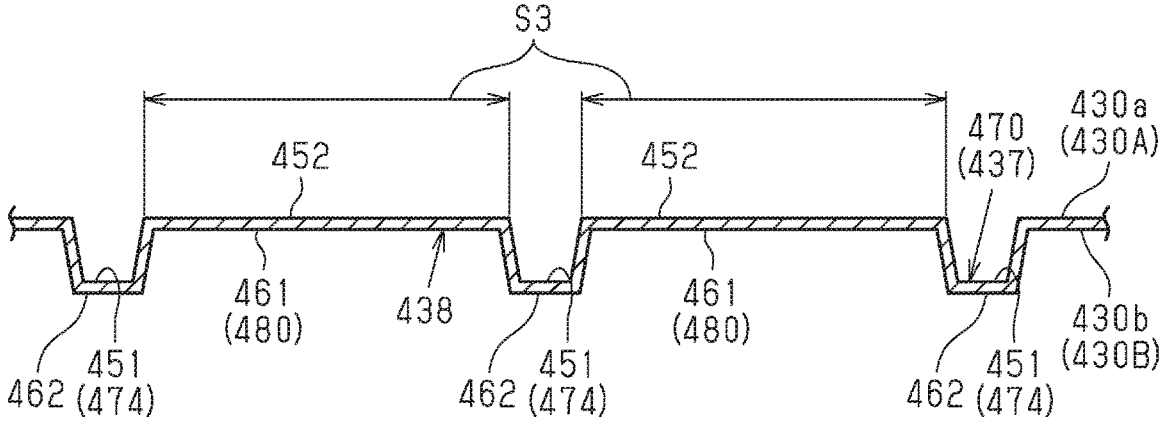
FIG. 23 is a cross-sectional view taken along line 23-23 in FIG. 21.
Figure 23:
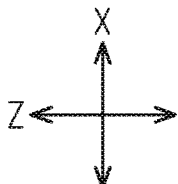

As shown in FIGS. 21 to 23, the interval S3 between the wavy sections 470 increases from the upstream side toward the downstream side. Specifically, the width of the interval S3 increases toward the downstream side. In the present embodiment, the width of the interval S3 between a first tributary passage 473 of each groove passage 437 and the adjacent first tributary passage 473 of the adjacent groove passage 437 is the same as the width of the interval S1 in a section in which the two first tributary passages 473 extend in parallel. Also, the width of the interval S3 between a second tributary passage 474 of each groove passage 437 and the adjacent second tributary passage 474 of the adjacent groove passage 437 is the same as the width of the interval S2 in a section in which the two second tributary passages 474 extend in parallel (refer to FIG. 22).

Figure 24:
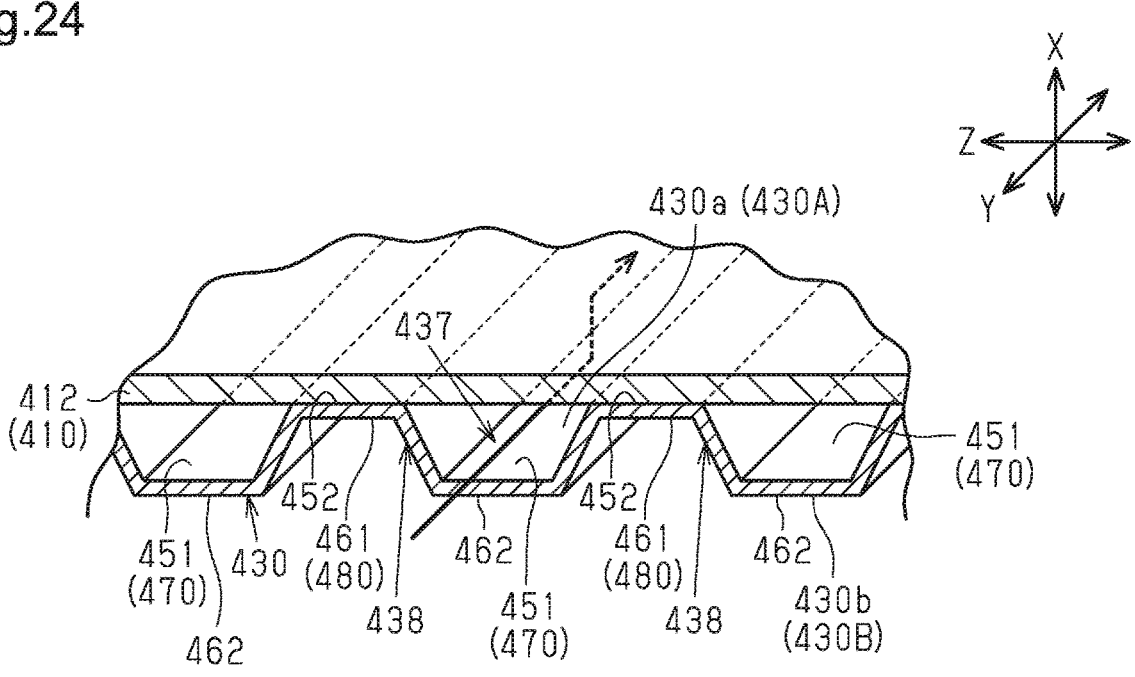
FIG. 24 is a cross-sectional view illustrating a flow of fuel gas that permeates into the gas diffusion layer from a groove passage shown in FIG. 21.

As shown in FIG. 24, the wavy sections 470 include recesses 451 formed in the first surface 430A of the separator 430. Ribs 452, which are protrusions, are provided between the recesses 451. The protruding ends of the ribs 452 are in contact with the GDL 412 of the MEA 410, which is adjacent to the separator 430.

As shown in FIG. 21, the groove passages 437 include an outer side groove passage 437A, which is located at the outermost position in the third direction Z. The outer side groove passage 437A includes sections that are located outside the outer edge of the contact surface 430a in the third direction Z.

As shown in FIG. 20, the groove passages 438 connect the through-hole 433 and the through-hole 434 to each other. The groove passages 438 are provided in the second surface 430B. In the groove passages 438, cooling medium flows in a direction opposite to the flowing direction of the fuel gas flowing through the groove passages 437.

As shown in FIG. 24, the groove passages 438 include wavy sections 480. The wavy sections 480 are provided in a surface 430b on a side opposite to the contact surface 430a and extend in wavy shapes in planar directions of the surface 430b. The wavy sections 480 include recesses 461 formed in the second surface 430B of the separator 430. Ribs 462, which are protrusions, are provided between the recesses 461. The back side of each rib 462 is the recess 451 that forms the wavy sections 470 of each groove passage 437. Likewise, the back side of each rib 452 is the recess 461 that forms the wavy section 480 of each groove passage 438. That is, the shapes of protrusions and recesses of the wavy sections 480 in the groove passages 438 and the shapes of recesses and protrusions of the wavy sections 470 in the groove passages 437 conform to each other.

<Separator 440>

As shown in FIG. 20, the separator 440 is a rectangular plate elongated in the second direction Y.

The separator 440 is formed by pressing, for example, a metal member made of titanium or stainless steel.

The separator 440 is provided on the side of the MEA 410 on which the cathode 411A is provided. The separator 440 includes a first surface 440A and a second surface 440B, which is on a side opposite to the first surface 440A. The first surface 440A includes a contact surface, which contacts the MEA 410.

The separator 440 includes through-holes 441, 442, 443, 444, 445, 446, which are respectively part of the holes 491, 492, 493, 494, 495, 496. In the third direction Z, the through-holes 441, 444, 446 are provided at positions that correspond to the through-holes 421, 424, 426 of the frame member 420. Also, in the third direction Z, the through-holes 442, 443, 445 are provided at positions that correspond to the through-holes 422, 423, 425 of the frame member 420.

As shown in FIG. 20, the separator 440 includes groove passages 447 through which oxidant gas flows and groove passages 448 through which cooling medium flows. FIG. 20 illustrates, in a simplified manner, the outer edge of a section in the separator 440 that includes the groove passages 447 and the outer edge of a section in the separator 440 that includes the groove passages 448.

The groove passages 447 connect the through-hole 445 and the through-hole 446 to each other. In the groove passages 447, the oxidant gas flows in a direction opposite to the flowing direction of the fuel gas flowing through the groove passages 437.

The groove passages 448 connect the through-hole 443 and the through-hole 444 to each other. In the groove passages 448, the cooling medium flows in the same as the flowing direction of the oxidant gas flowing through the groove passages 447.

Operation of the fourth embodiment will now be described.

Figure 25:
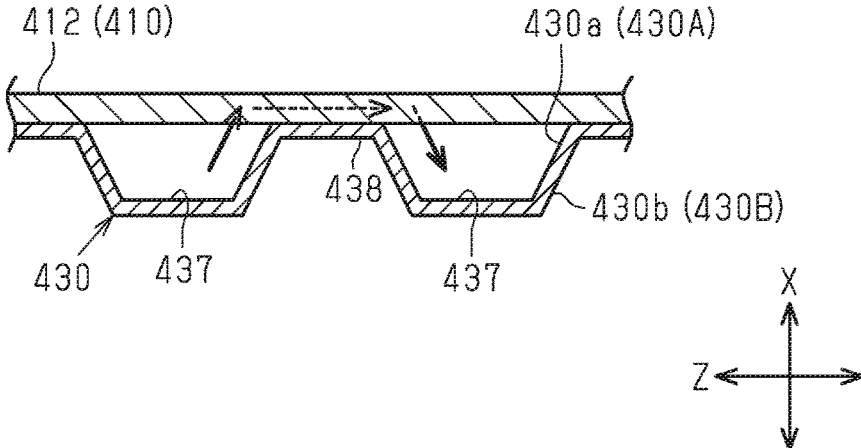
FIG. 25 is a cross-sectional view illustrating a flow of fuel gas that permeates into the gas diffusion layer from a groove passage shown in FIG. 21.

Arrows in FIGS. 24 and 25 indicate the flow of fuel gas that permeates the GDL 412 from the groove passages 437.

As shown in FIG. 24, in the process of flowing through the groove passages 437 of the separator 430, the fuel gas gradually permeates into the MEA 410, which is adjacent to the separator 430. More specifically, the fuel gas permeates into the GDL 412 of the MEA 410. With the configuration according to the fourth embodiment, as shown in FIG. 21, fuel gas flows through each groove passage 437 from the through-hole 431 to the connecting passage 475, and splits into the four second tributary passages 474 to flow downstream toward the second tributary passages 474. The fuel gas that flows through the second tributary passages 474 merges at the merging portions 471b, 471c and flows to the first tributary passages 473. The fuel gas that flows through the first tributary passages 473 merges at the merging portion 471a and flows to the mainstream passage 472. In the groove passage 437, the pressure loss of the fuel gas is larger in a section on the downstream side of the merging portion 471a (471b, 471c) than in a section on the upstream side of the merging portion 471a (471b, 471c). This promotes permeation of fuel gas into the GDL 412 in the section on the downstream side the merging portion 471a (471b, 471c) in the groove passage 437.

The fourth embodiment has the following advantages.

(17) The wavy section 470 of each groove passage 437 extends in a wavy shape in planar directions of the contact surface 430a. The wavy section 470 includes the tributary passages 473 (474) and the merging portion 471a (471b, 471c), at which the tributary passages 473 (474) merge from the upstream side toward the downstream side.

This configuration operates in the above-described manner. This configuration thus limits reduction in the amount of fuel gas that permeates into the GDL 412 in the downstream portion of each groove passage 437. This increases power generation in the downstream portion of each groove passages 437. Accordingly, the power generation efficiency of the fuel cell is increased.

Also, with the above-described configuration, when such single cells are stacked, the ribs in one of the single cells that form the groove passages 447 of the separator 440 and the ribs 462 in another single cell that form the groove passages 437 of the separator 430 contact each other in a larger area. This increases the stability of the contacting structure of the adjacent separators 430, 440 and thus increases the stability of the contacting structure of the single cells.

(18) Each wavy section 470 includes the merging portions 471*a*, 471*b*, 471*c*.

With this configuration, the number of the tributary passages increases toward the upstream end of the wavy section 470. Thus, the pressure loss of fuel gas increases toward the downstream end of the groove passage 437. Accordingly, permeation of the fuel gas into the GDL 412 is more promoted toward the downstream end, at which the flow rate of the fuel gas flowing through the groove passage 437 is small. This configuration thus limits reduction in the amount of the fuel gas that permeates into the GDL 412 effectively.

(19) The amplitude A of each wavy section 470 is larger in the downstream portion than in the upstream portion.

With this configuration, the pressure loss of fuel gas is larger in the downstream portion than in the upstream portion in the groove passage 437. This promotes permeation of fuel gas into the GDL 412 in the downstream portion of the groove passage 437 as compared to a case in which the amplitude A in the downstream portion of the wavy section 470 is the same as the amplitude A in the upstream portion. This configuration thus more effectively limits reduction in the amount of the fuel gas that permeates into the GDL 412.

(20) Each groove passage 437 includes the wavy section 470, which extends in a wavy shape in planar directions of the contact surface 430*a*. Each wavy section 470 includes the tributary passages 473, 474 and the merging portions 471*a*, 471*b*, 471*c*. The width of the interval S3 between the wavy sections 470 increases toward the downstream end.

In each groove passage 437 having the above described configuration, the pressure loss of the fuel gas is larger in the sections on the downstream side of the merging portions 471*a*, 471*b*, 471*c* than in the sections on the upstream side of the merging portions 471*a*, 471*b*, 471*c*. This thus further effectively limits reduction in the amount of the fuel gas that permeates into the GDL 412 in the downstream portion of the groove passages 437.

In the groove passage 447, oxidant gas flows in a direction opposite to the flowing direction of fuel gas. Thus, the MEA 410 tends to be heated in the upstream portion of the groove passage 447, that is, in the downstream portion of the groove passage 437. In this regard, the width of the interval S3 between the wavy sections 470 increases toward the downstream end in the above-described configuration. Thus, the flow rate of the cooling medium flowing through the groove passages 438 is increased in the downstream portion of the groove passages 437, that is, in the upstream portion of the groove passages 438. This prevents the MEA 410 from being heated in the downstream portion of the groove passage 437. Accordingly, the power generation efficiency of the fuel cell is further increased.

(21) The first tributary passages 473 in the wavy section 470, which merge at the merging portion 471*a*, are independent from each other at positions other than the merging portion 471*a*. Also, the second tributary passages 474 in the wavy section 470, which merge at the merging portions 471*b*, 471*c*, are independent from each other at positions other than the merging portions 471*b*, 471*c*.

For example, if the second tributary passages 474 were connected to each other, the dynamic pressure of the fuel gas flowing through the second tributary passages 474 would be equalized at the connected sections. This may reduce the difference between the pressure loss of the fuel gas in the second tributary passages 474 and the pressure loss of the fuel gas in the downstream portion of the merging portions 471*b*, 471*c*. However, the first tributary passages 473 are independent from each other and the second tributary passages 474 are independent from each other at positions other than the merging portions 471*a*, 471*b*, 471*c* in the above-described configuration. This limits reduction in the difference between the pressure loss of fuel gas in the section on the upstream side of the merging portions 471*a*, 471*b*, 471*c* and the pressure loss of fuel gas in the section on the downstream side of the merging portions 471*a*, 471*b*, 471*c*.

(22) The groove passages 437 are arranged side by side in the third direction Z and include the outer side groove passage 437A, which is located at the outermost position in the third direction Z. The outer side groove passage 437A includes sections that are located outside the outer edge of the contact surface 430*a* in the third direction Z.

When the pressure loss of fuel gas is different between adjacent groove passages 437, some of the fuel gas flowing through the groove passage 437 in which the pressure loss is larger may permeate into the GDL 412 and flow to the groove passage 437 in which the pressure loss is smaller, as shown in FIG. 25. Such permeation of fuel gas into a section of the GDL 412 between adjacent groove passages 437 also generates power.

However, the outer side groove passage 437A does not have a groove passage 437 on its outer side in the third direction Z. Thus, if the entire outer side groove passage 437A were located inside the contact surface 430*a* in the third direction Z, it would be difficult to cause fuel gas to permeate into a section of the GDL 412 that is on the outer side of the outer side groove passage 437A by using a difference in the pressure loss of fuel gas described above. This would reduce the power generation efficiency.

In this regard, the above-described configuration reduces the ratio of the section of the GDL 412 that is located on the outer side of the outer side groove passage 437A. This allows fuel gas to permeate into a wider area of the GDL 412. The power generation efficiency is therefore improved.

<Modifications>

The fourth embodiment may be modified as follows. The fourth embodiment and the following modifications can be combined as long as the combined modifications remain technically consistent with each other.

The shapes of the inlet holes 491, 493, 495 and the outlet holes 492, 494, 496 are not limited to a rectangular shape in plan view as in the fourth embodiment. For example, the shapes of the inlet holes 491, 493, 495 and the outlet holes 492, 494, 496 may be square or stadium-shaped in plan view.

The flows of the reactant gas through the holes 491, 492, 493, 494, 495, 496 are not limited to those described in the fourth embodiment. For example, the hole 496 may be used as an outlet hole for oxidant gas, and the hole 495 may be used as an outlet hole for the oxidant gas. Accordingly, the hole 494 may be used as an inlet hole for cooling medium, and the hole 493 may be used as the outlet hole for the cooling medium. That is, the oxidant gas that flows through the groove passages 447 and the cooling medium that flows through the groove passages 438, 448 may flow in the same direction as the fuel gas flowing through the groove passages 437.

The number of the groove passages 437 is not limited to four as described in the fourth embodiment, but may be less than or greater than four.

The separator 430 does not necessarily need to be configured such that the wavy sections 470 have the same shape as described in the fourth embodiment. For example, the wavelength and the amplitude A of the wavy section 470 may vary between the groove passages 437.

The width, that is, the cross-sectional flow area of each groove passage 437 does not necessarily need to be constant over the entire groove passage 437 in the extending direction, as long as the operation and the advantages of the present disclosure are achieved.

The groove passages 437 do not necessarily need to be configured such that the outer side groove passage 437A includes sections that are located outside the outer edge of the contact surface 430*a* in the third direction Z as described in the fourth embodiment. For example, the outer side groove passage 437A may be located at the same position as or on the inner side of the outer edge of the contact surface 430*a* in the third direction Z.

The groove passages 437 do not necessarily need to extend in wavy shapes in planar directions of the contact surface 430*a*. That is, not all the groove passages 437 need to have the wavy section 470, but it suffices if at least one of the groove passages 437 has the wavy section 470.

The groove passages 437 do not necessarily need to be independent from one another as described in the fourth embodiment. For example, two of the groove passages 437 adjacent to each other may be connected to each other by another passage that extends in the third direction Z.

The two first tributary passages 473 do not necessarily need to be independent from each other at positions other than the merging portion 471*a* as described in the fourth embodiment. For example, the first tributary passages 473 may be connected to each other by another groove passage that extends in the third direction Z.

The two second tributary passages 474 do not necessarily need to be independent from each other at positions other than the merging portion 471*b* (471*c*) as described in the fourth embodiment. For example, the second tributary passages 474 may be connected to each other by another groove passage that extends in the third direction Z.

The amplitude A of each wavy section 470 does not necessarily need to increase toward the downstream end as described in the fourth embodiment. For example, the amplitude A of each wavy section 470 may be constant over the entire wavy section 470 in the extending direction.

Figure 26:
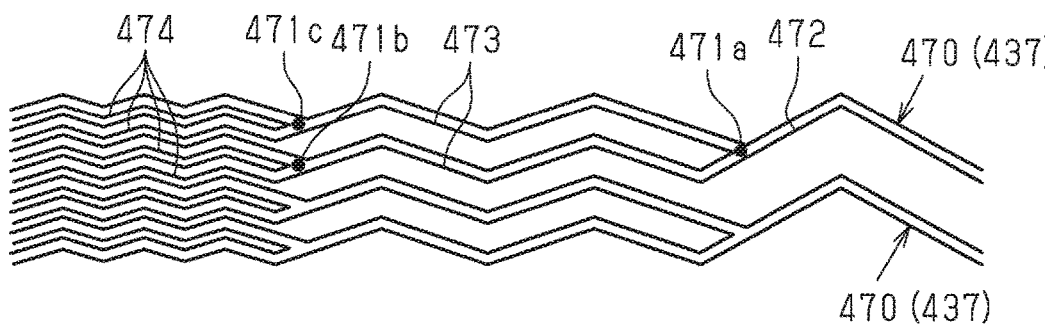
FIG. 26 is a plan view showing groove passages according to a modification.
Figure 26:
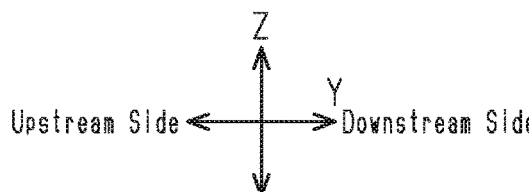

In the fourth embodiment, each wavy section 470 is configured such that the wavenumbers of the mainstream passage 472 and the tributary passages 473, 474 are all one. However, the present disclosure is not limited to this. For example, as shown in FIG. 26, the wavenumbers may decrease toward the downstream end such that the wavenumber of the second tributary passages 474 is three, the wavenumber of the first tributary passages 473 is two, and the wavenumber of the mainstream passage 472 is one.

The connecting passages 475 may be omitted if the upstream ends of the second tributary passages 474 are extended to the through-hole 431.

The number and the arrangement of the joining portions are not limited to the ones described in the fourth embodiment, but may be changed. The number and the arrangement of the tributary passages may be changed, accordingly.

The separator for a fuel cell according to the present disclosure is not limited to the separator 430, which is joined to the side of the MEA 410 that corresponds to the anode 411B as described in the fourth embodiment, but may be employed in the separator 440, which is joined to the side corresponding to the cathode 411A.

The separators 430, 440 do not necessarily need to be formed by pressing a metal member, but may be formed by cutting or etching.

The material for the separators 430, 440 are not limited to titanium or stainless steel, but may be aluminum or carbon.

Fifth Embodiment

A separator for a fuel cell according to a fifth embodiment will now be described with reference to FIGS. 27 to 29.

<Overall Configuration of Single Cell of Fuel Cell Stack>

Figure 27:
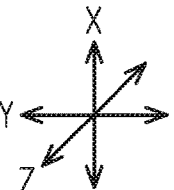
FIG. 27 is an exploded perspective view showing a single cell of a fuel cell.

As shown in FIG. 27, a single cell for a fuel cell stack includes a membrane electrode assembly 510 (hereinafter, referred to as MEA 510), a frame member 520, which supports the MEA 510, and two separators 530, 540, which hold the MEA 510 and the frame member 520 between them.

The single cell is a rectangular plate as a whole.

In the following description, the direction in which the separator 530, the layer including the MEA 510 and the frame member 520, and the separator 540 are stacked will be referred to as a first direction X.

A longitudinal direction of the single cell, which is orthogonal to the first direction X, will be referred to as a second direction Y.

Also, a direction that is orthogonal to both of the first direction X and the second direction Y will be referred to as a third direction Z.

The single cell has inlet holes 591, 593, 595 for introducing reactant gas or cooling medium into the single cell and outlet holes 592, 594, 596 for discharging the reactant gas and the cooling medium in the single cell to the outside. In the present embodiment, the inlet hole 591 and the outlet hole 592 are holes through which fuel gas flows. The inlet hole 593 and the outlet hole 594 are holes through which cooling medium flows. The inlet hole 595 and the outlet hole 596 are holes through which oxidant gas flows. The fuel gas is hydrogen gas. The cooling medium is water. The oxidant gas is air.

The inlet holes 591, 593, 595 and the outlet holes 592, 594, 596 each have a rectangular shape elongated in the second direction Y in plan view, and extend in the first direction X through the single cell. The inlet hole 591 and the outlet holes 594, 596 are located on one side in the second direction Y of the single cell (on the left side in the left-right direction in FIG. 27). The inlet hole 591 and the outlet holes 594, 596 are arranged side by side in the third direction Z while being spaced apart from each other. The outlet hole 592 and the inlet holes 593, 595 are located on the other side in the second direction Y (on the right side in FIG. 27). The outlet hole 592 and the inlet holes 593, 595 are arranged side by side in the third direction Z while being spaced apart from each other.

<MEA 510>

As shown in FIG. 27, the MEA 510 has a rectangular shape elongated in the second direction Y.

The MEA 510 includes a solid polymer electrolyte membrane (not shown; hereinafter referred to as an electrolyte membrane) and electrodes 511A, 511B respectively provided on opposite surfaces of the electrolyte membrane. In the present embodiment, the electrode that is joined to one side in the first direction X (the upper side in the up-down direction in FIG. 27) of the electrolyte membrane (not shown) is a cathode 511A. Also, the electrode joined to the other side in the first direction X (the lower side in the in FIG. 27) of the electrolyte membrane is an anode 511B.

The electrodes 511A, 511B each include a catalyst layer (not shown) joined to the electrolyte membrane and a gas diffusion layer 512 (hereinafter referred to as a GDL 512), which is joined to the catalyst layer.

The MEA 510 corresponds to a power generating unit of the fuel cell according to the present disclosure.

<Frame Member 520>

As shown in FIG. 27, the frame member 520 has a rectangular shape elongated in the second direction Y.

The frame member 520 is made of, for example, a hard plastic.

The frame member 520 includes through-holes 521, 522, 523, 524, 525, 526, which are respectively part of the holes 591, 592, 593, 594, 595, 596.

The frame member 520 includes an opening 527, which has a rectangular shape elongated in the second direction Y, in a center. The MEA 510 is joined to the edge of the opening 527 from one side in the first direction X (upper side as viewed in FIG. 27).

<Separator 530>

As shown in FIG. 27, the separator 530 is a rectangular plate elongated in the second direction Y.

The separator 530 is formed by pressing, for example, a metal member made of titanium or stainless steel.

The separator 530 is provided on the side of the MEA 510 on which the anode 511B is provided. The separator 530 includes a first surface 530A and a second surface 530B, which is on a side opposite to the first surface 530A. The first surface 530A includes a contact surface 530a, which contacts the MEA 510 (refer to FIG. 28).

The separator 530 includes through-holes 531, 532, 533, 534, 535, 536, which are respectively part of the holes 591, 592, 593, 594, 595, 596. In the third direction Z, the through-holes 531, 534, 536 are provided at positions that correspond to the through-holes 521, 524, 526 of the frame member 520. Also, in the third direction Z, the through-holes 532, 533, 535 are provided at positions that correspond to the through-holes 522, 523, 525 of the frame member 520.

The separator 530 includes groove passages 537 through which fuel gas flows and groove passages 538 through which cooling medium flows. FIG. 27 illustrates, in a simplified manner, the outer edge of a section in the separator 530 that includes the groove passages 537 and the outer edge of a section in the separator 530 that includes the groove passages 538.

<Groove Passages 537, 538>

Figure 28:
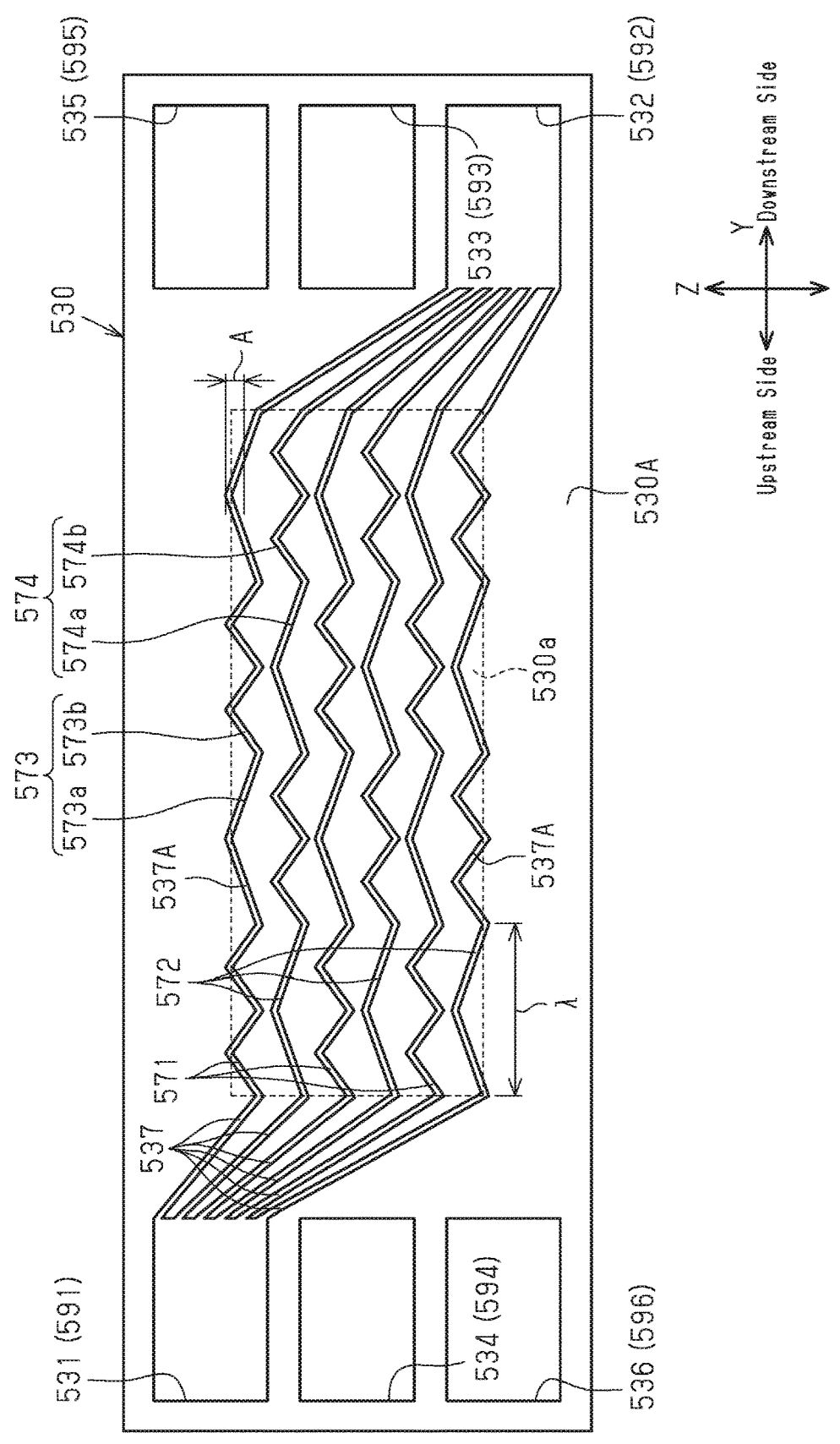
FIG. 28 is a plan view of a separator for a fuel cell according to a fifth embodiment that is used in the single cell shown in FIG. 27 and includes groove passages arranged side by side, through which fuel gas flows.

As shown in FIG. 28, the groove passages 537 connect the through-hole 531 and the through-hole 532 to each other. The groove passages 537 are provided in the first surface 530A. In the present embodiment, the groove passages 537, of which there are six, are arranged side by side in the third direction Z while being spaced apart from each other. That is, the six groove passages 537 are independent from one another.

The width, that is, the cross-sectional flow area of each groove passage 537 is constant over the entire groove passage 537 in the extending direction. The groove passages 537 have the same width.

The groove passages 537 include first groove passages 571 and second groove passages 572, which are adjacent to each other in the third direction Z. In the present embodiment, the number of the first groove passages 571 and the number of the second groove passages 572 are respectively three. The first groove passages 571 and the second groove passages 572 are arranged side by side alternately in the third direction Z.

Each first groove passage 571 includes a wavy section 573. The wavy sections 573 are provided in the contact surface 530a and extend in wavy shapes in planar directions of the contact surface 530a.

Each wavy section 573 includes two first parts 573a and two second parts 573b, of which the wavelength $\lambda$ is smaller than that of the first parts 573a. The first parts 573a and the second parts 573b are arranged side by side alternately in the extending direction of the wavy section 573. In the present embodiment, the wavenumber of each first part 573a is one. The wavenumber of each second part 573b is two. The wavelength $\lambda$ of the first part 573a is twice as long as the wavelength $\lambda$ of the second part 573b. The amplitude A of each wavy section 573 is constant over the entire wavy section 573 in the extending direction.

Each second groove passage 572 includes a wavy section 574. The wavy sections 574 are provided in the contact surface 530a and extend in wavy shapes in planar directions of the contact surface 530a.

Each wavy section 574 includes two first parts 574a and two second parts 574b, of which the wavelength $\lambda$ is smaller than that of the first parts 574a. The first parts 574a and the second parts 574b are arranged side by side alternately in the extending direction of the wavy section 574. In the present embodiment, the first part 574a has the same shape as the first part 573a. The second part 574b has the same shape as the second part 573b. Each first part 574a is adjacent to one of the second parts 573b of the first groove passage 571 in the third direction Z. Each second part 574b is adjacent to one of the first parts 573a of the first groove passage 571 in the third direction Z.

Figure 29:
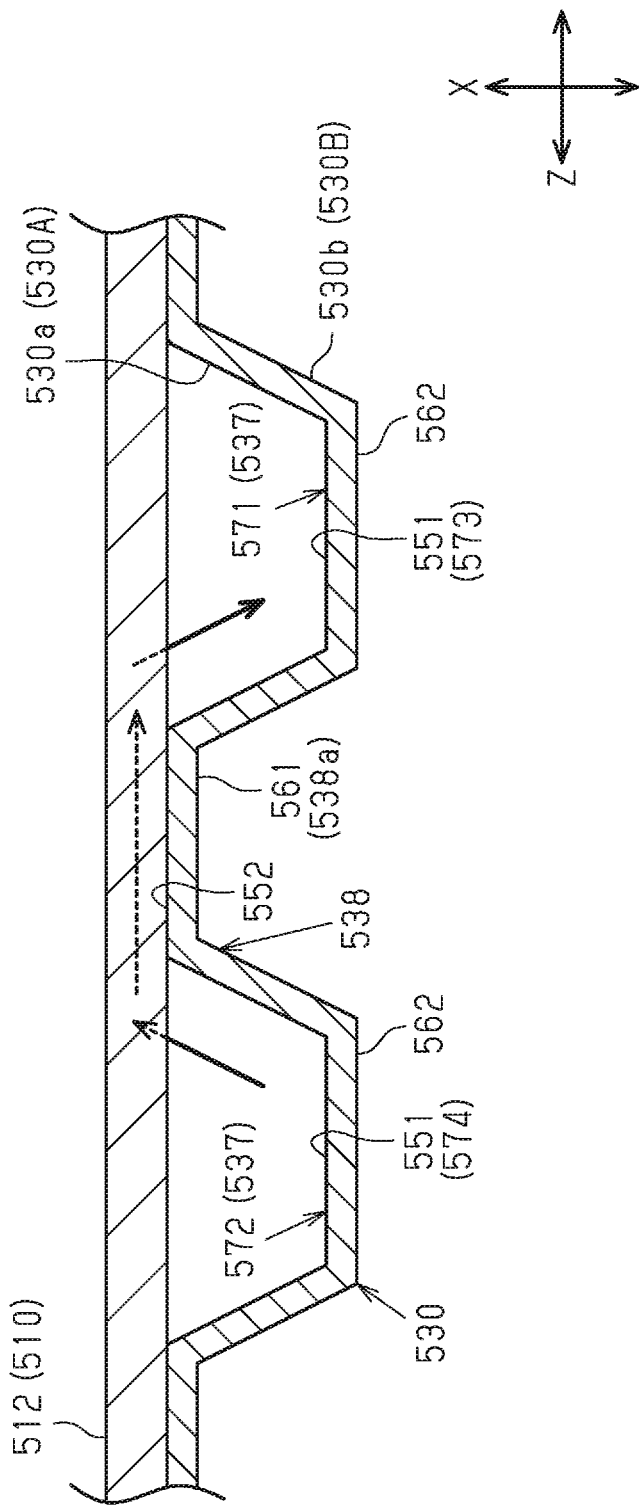
FIG. 29 is a cross-sectional view illustrating a flow of fuel gas that permeates into the gas diffusion layer from a groove passage shown in FIG. 28.

As shown in FIG. 29, the wavy sections 573, 574 include recesses 551 formed in the first surface 530A of the separator 530. Ribs 552, which are protrusions, are provided between the recesses 551. The protruding ends of the ribs 552 are in contact with the GDL 512 of the MEA 510, which is adjacent to the separator 530.

As shown in FIG. 28, the groove passages 537 include an outer side groove passage 537A, which is located at the outermost position in the third direction Z. The outer side groove passage 537A includes sections that are located outside the outer edge of the contact surface 530a in the third direction Z.

As shown in FIG. 27, the groove passages 538 connect the through-hole 533 and the through-hole 534 to each other. The groove passages 538 are provided in the second surface 530B. In the groove passages 538, cooling medium flows in a direction opposite to the flowing direction of the fuel gas flowing through the groove passages 537.

As shown in FIG. 29, the groove passages 538 include wavy sections 538a. The wavy sections 538a are provided in a surface 530b on a side opposite to the contact surface 530a and extend in wavy shapes in planar directions of the surface 530b. The wavy sections 538a include recesses 561 formed in the second surface 530B of the separator 530. Ribs 562, which are protrusions, are provided between the recesses 561. The back side of each rib 562 is the recess 551 that forms the wavy sections 573, 574 of each groove passage 537. Likewise, the back side of each rib 552 is the recess 561 that forms the wavy section 538a of each groove passage 538. That is, the shapes of protrusions and recesses of the wavy sections 538a in the groove passages 538 and the shapes of recesses and protrusions of the wavy sections 573, 574 in the groove passages 537 conform to each other.

<Separator 540>

As shown in FIG. 27, the separator 540 is a rectangular plate elongated in the second direction Y.

The separator 540 is formed by pressing, for example, a metal member made of titanium or stainless steel.

The separator 540 is provided on the side of the MEA 510 on which the cathode 511A is provided. The separator 540 includes a first surface 540A and a second surface 540B, which is on a side opposite to the first surface 540A. The first surface 540A includes a contact surface, which contacts the MEA 510.

The separator 540 includes through-holes 541, 542, 543, 544, 545, 546, which are respectively part of the holes 591, 592, 593, 594, 595, 596. In the third direction Z, the through-holes 541, 544, 546 are provided at positions that correspond to the through-holes 521, 524, 526 of the frame member 520. Also, in the third direction Z, the through-holes 542, 543, 545 are provided at positions that correspond to the through-holes 522, 523, 525 of the frame member 520.

As shown in FIG. 27, the separator 540 includes groove passages 547 through which oxidant gas flows and groove passages 548 through which cooling medium flows. FIG. 27 illustrates, in a simplified manner, the outer edge of a section in the separator 540 that includes the groove passages 547 and the outer edge of a section in the separator 540 that includes the groove passages 548.

The groove passages 547 connect the through-hole 545 and the through-hole 546 to each other. In the groove passages 547, the oxidant gas flows in a direction opposite to the flowing direction of the fuel gas flowing through the groove passages 537.

The groove passages 548 connect the through-hole 543 and the through-hole 544 to each other. In the groove passages 548, the cooling medium flows in the same as the flowing direction of the oxidant gas flowing through the groove passages 547.

Operation of the fifth embodiment will now be described.

Arrows in FIG. 29 indicate the flow of fuel gas that permeates into the GDL 512 from the groove passages 537.

As shown in FIG. 29, in the wavy sections 573, 574 of the groove passages 537, which extend in a wavy manner, the pressure loss of flowing fuel gas is larger in a region in which the wavelength λ is small than in a region in which the wavelength λ is large.

According to the configuration of the fifth embodiment, there is a difference in the pressure loss of fuel gas between each first part 573a of the first groove passage 571 and the second part 574b of the second groove passage 572 that is adjacent to the first part 573a. Thus, some of the fuel gas that is flowing through the second part 574b, which has a larger pressure loss than the first part 573a, permeates into the GDL 512 and flows to the first part 573a, which has a smaller pressure loss than the second part 574b.

Also, there is a difference in the pressure loss of fuel gas between each second part 573b of the first groove passage 571 and the first part 574a of the second groove passage 572 that is adjacent to the second part 573b. Thus, some of the fuel gas that is flowing through the second part 573b, which has a larger pressure loss than the first part 574a, permeates into the GDL 512 and flows to the first part 574a, which has a smaller pressure loss than the second part 573b.

The fifth embodiment has the following advantages.

(23) The groove passages 537 include the first groove passages 571 and the second groove passages 572, which extend in wavy shapes in planar directions of the contact surface 530a and are adjacent to each other in the third direction Z. The wavelength λ of the first part 573a of the first groove passage 571 is different from the wavelength λ of the second part 574b of the second groove passage 572 that is adjacent to the first part 573a. Also, the wavelength λ of the second part 573b of the first groove passage 571 is different from the wavelength λ of the first part 574a of the second groove passage 572 that is adjacent to the second part 573b.

This configuration operates in the above-described manner. Accordingly, fuel gas permeates into a wider area in the GDL 512. This increases power generation in a wider area in the GDL 512. Accordingly, the power generation efficiency of the fuel cell is increased.

(24) The wavy section 573 of each first groove passage 571 includes the first parts 573a and the second parts 573b, of which the wavelength λ is smaller than that of the first parts 573a. The wavelength λ of each second part 574b of each second groove passage 572 that is adjacent to a first part 573a is smaller than the wavelength λ of the first part 573a. The wavelength λ of each first part 574a of each second groove passage 572 that is adjacent to a second part 573b is smaller than the wavelength λ of the second part 573b.

For example, if the wavelength λ of the wavy section 573 of each first groove passage 571 is smaller than the wavelength λ of the wavy section 574 of the second groove passage 572 over the entire wavy section 573 in the extending direction, the following problems may occur. The fuel gas flowing through each first groove passage 571 would flow into the corresponding second groove passage 572 via the GDL 512 over the entire length in the extending direction. This would reduce the amount of fuel gas that permeates into the GDL 512 in the downstream portion of the flow of fuel gas in the first groove passage 571. This may reduce power generation in the downstream portion.

However, in the above-described configuration, the fuel gas flowing through the second part 574b of each second groove passage 572 that is adjacent to a first part 573a flows to the first part 573a via the GDL 512. On the other hand, the fuel gas flowing through each second part 573b flows to a first part 574a of the second groove passage 572 that is adjacent to the second part 573b via the GDL 512. This prevents the flow of fuel gas that permeates into the GDL 512 from the groove passage 537 from being concentrated either in the first groove passage 571 or in the second groove passage 572. This limits reduction in the amount of fuel gas that permeates into the GDL 512 in the downstream portion of one of the first groove passage 571 and the second groove passage 572.

(25) The first groove passages 571 and the second groove passages 572 are independent from each other.

For example, if the first groove passage 571 and the second groove passage 572 were connected to each other, the dynamic pressure of fuel gas flowing through the groove passages 571, 572 would be equalized at the connected sections. It thus would be difficult to adjust the pressure loss of fuel gas by differentiating the wavelength λ between the first groove passage 571 and the second groove passage 572. However, the first groove passages 571 and the second groove passages 572 are independent from each other in the above-described configuration. Accordingly, it is easy to adjust the pressure loss of fuel gas in the first groove passage 571 and the second groove passage 572.

(26) The first groove passages 571 and the second groove passages 572 are arranged alternately in the third direction Z.

This configuration generates, in each of the groove passages 571, 572, flow of fuel gas between each of the groove passages 571 (572) and the adjacent groove passages 572 (571) via the GDL 512. Accordingly, fuel gas permeates into a wider area in the GDL 512.

(27) The groove passages 537 include the outer side groove passage 537A, which is located at the outermost position in the third direction Z. The outer side groove passage 537A includes sections that are located outside the outer edge of the contact surface 530a in the third direction Z.

The outer side groove passage 537A does not have a groove passage 537 on its outer side in the third direction Z. Thus, if the entire outer side groove passage 537A were located inside the contact surface 530a in the third direction Z, it would be difficult to cause fuel gas to permeate into a section of the GDL 512 that is on the outer side of the outer side groove passage 537A by using a difference in the pressure loss of fuel gas described above. This would reduce the power generation efficiency.

In this regard, the above-described configuration reduces the ratio of the section of the GDL 512 that is located on the outer side of the outer side groove passage 537A. This allows fuel gas to permeate into a wider area of the GDL 512. The power generation efficiency is therefore improved.

Sixth Embodiment

A separator for a fuel cell according to a sixth embodiment will be described with reference to FIG. 30. The differences from the fifth embodiment will mainly be discussed.

The same or corresponding components as those in the fifth embodiment are given the same reference numerals, and detailed explanations are omitted.

Figure 30:
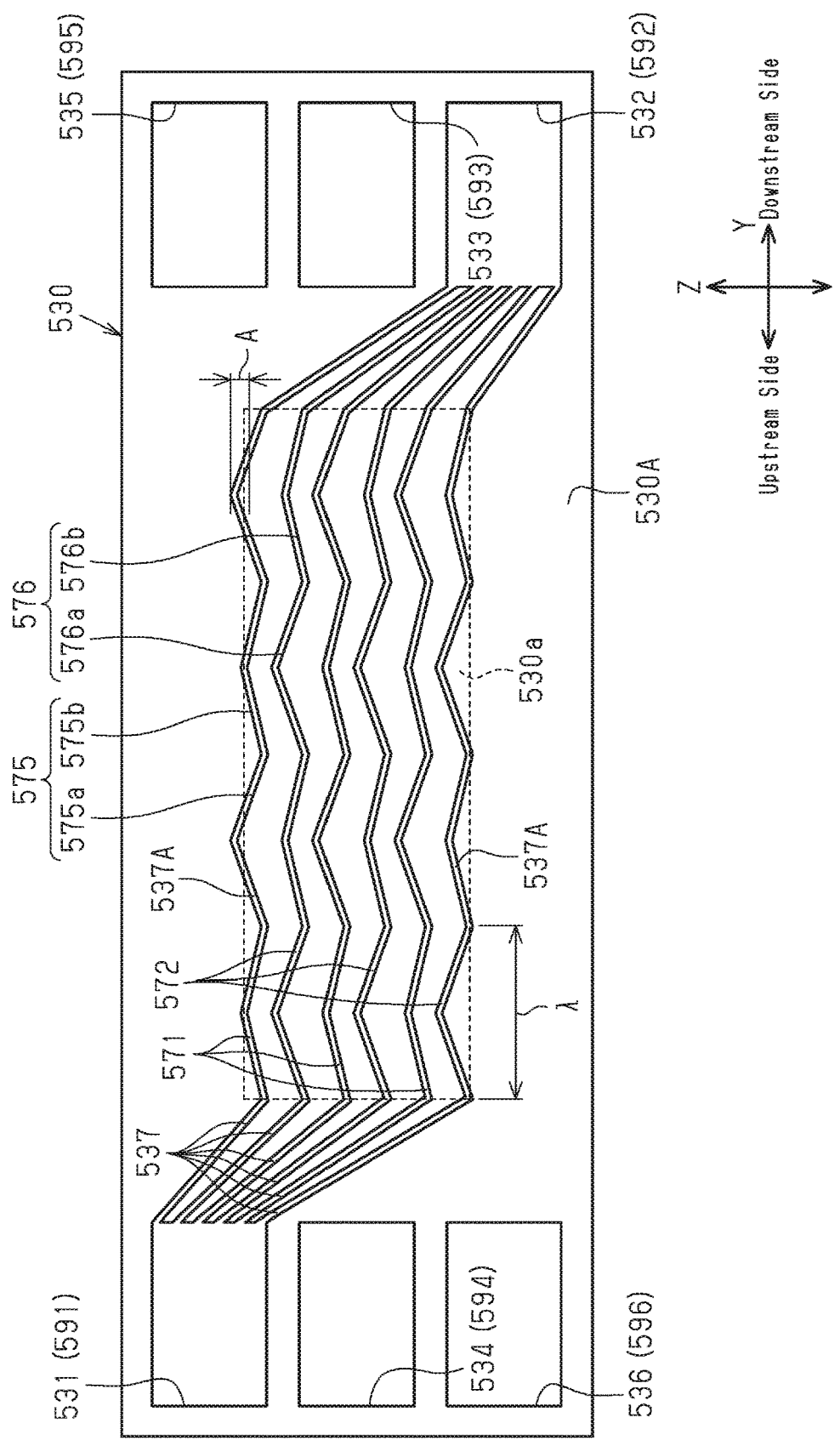
FIG. 30 is a plan view corresponding to FIG. 28, illustrating a separator for a fuel cell according to a sixth embodiment.

As shown in FIG. 30, a separator 530 includes groove passages 537 through which fuel gas flows. The groove passages 537 connect the through-hole 531 and the through-hole 532 to each other. The groove passages 537 are provided in the first surface 530A. In the present embodiment, the groove passages 537, of which there are six, are arranged side by side in the third direction Z while being spaced apart from each other.

The width, that is, the cross-sectional flow area of each groove passage 537 is constant over the entire groove passage 537 in the extending direction. The groove passages 537 have the same width.

The groove passages 537 include first groove passages 571 and second groove passages 572, which are adjacent to each other in the third direction Z. In the present embodiment, the number of the first groove passages 571 and the number of the second groove passages 572 are respectively three. The first groove passages 571 and the second groove passages 572 are arranged side by side alternately in the third direction Z.

Each first groove passage 571 includes a wavy section 575. The wavy sections 575 are provided in the contact surface 530a and extend in wavy shapes in planar directions of the contact surface 530a.

Each wavy section 575 includes two first parts 575a and two second parts 575b, of which the amplitude A is smaller than that of the first parts 575a. The first parts 575a and the second parts 575b are arranged side by side alternately in the extending direction of the wavy section 575. In the present embodiment, the wavenumber of each first part 575a and the wavenumber of each second part 575b are both one. The wavelength λ of each wavy section 575 is constant over the entire wavy section 575 in the extending direction.

Each second groove passage 572 includes a wavy section 576. The wavy sections 576 are provided in the contact surface 530a and extend in wavy shapes in planar directions of the contact surface 530a.

Each wavy section 576 includes two first parts 576a and two second parts 576b, of which the amplitude A is smaller than that of the first parts 576a. The first parts 576a and the second parts 576b are arranged side by side alternately in the extending direction of the wavy section 576. In the present embodiment, the first part 576a has the same shape as the first part 575a. The second part 576b has the same shape as the second part 575b. Each first part 576a is adjacent to one of the second parts 575b of the first groove passage 571 in the third direction Z. Each second part 576b is adjacent to one of the first parts 575a of the first groove passage 571 in the third direction Z.

Operation of the sixth embodiment will now be described.

In the wavy sections 575, 576 of the groove passages 537, which extend in a wavy manner, the pressure loss of flowing fuel gas is larger in a region in which the amplitude A is large than in a region in which the amplitude A is small. According to the configuration of the sixth embodiment, there is a difference in the pressure loss of fuel gas between each first part 575a of the first groove passage 571 and the second part 576b of the second groove passage 572 that is adjacent to the first part 575a. Thus, some of the fuel gas that is flowing through the first part 575a, which has a larger pressure loss than the second part 576b, permeates into the GDL 512 and flows to the second part 576b, which has a smaller pressure loss than the first part 575a.

Also, there is a difference in the pressure loss of fuel gas between each second part 575b of the first groove passage 571 and the first part 576a of the second groove passage 572 that is adjacent to the second part 575b. Thus, some of the fuel gas that is flowing through the first part 576a, which has a larger pressure loss than the second part 575b, permeates into the GDL 512 and flows to the second part 575b, which has a smaller pressure loss than the first part 576a.

The sixth embodiment has the following advantages.

(28) The groove passages 537 include the first groove passages 571 and the second groove passages 572, which extend in wavy shapes in planar directions of the contact surface 530a and are adjacent to each other in the third direction Z. The amplitude A of specific parts of the first groove passage 571 is different from the amplitude A of the parts of the second groove passage 572 that are adjacent to those specific parts.

This configuration operates in the above-described manner. Accordingly, fuel gas permeates into a wider area in the GDL 512. This increases power generation in a wider area in the GDL 512. Accordingly, the power generation efficiency of the fuel cell is increased.

(29) The wavy section 575 of each first groove passage 571 includes the first parts 575a and the second parts 575b, of which the amplitude A is smaller than that of the first parts 575a. The amplitude A of each second part 576b of each second groove passage 572 that is adjacent to a first part 575a is smaller than the amplitude A of the first part 575a. The amplitude A of each first part 576a of each second groove passage 572 that is adjacent to a second part 575b is smaller than the amplitude A of the second part 575b.

For example, if the amplitude A of the wavy section 575 of each first groove passage 571 is larger than the amplitude A of the wavy section 576 of the second groove passage 572 over the entire wavy section 575 in the extending direction, the following problems may occur. The fuel gas flowing through each first groove passage 571 would flow into the corresponding second groove passage 572 via the GDL 512 over the entire length in the extending direction. This would reduce the amount of fuel gas that permeates into the GDL 512 in the downstream portion of the flow of fuel gas in the first groove passage 571. This may reduce power generation in the downstream portion.

However, in the above-described configuration, the fuel gas flowing through the first part 576a of each second groove passage 572 that is adjacent to a second part 575b flows to the first part 571 via the GDL 512. On the other hand, the fuel gas flowing through each first part 575a flows to a second part 576b of the second groove passage 572 that is adjacent to the first part 575a via the GDL 512. This prevents the flow of fuel gas that permeates into the GDL 512 from the groove passage from being concentrated either in the first groove passage 571 or in the second groove passage 572. This limits reduction in the amount of fuel gas that permeates into the GDL 512 in the downstream portion of one of the first groove passage 571 and the second groove passage 572.

(30) The first groove passages 571 and the second groove passages 572 are independent from each other.

For example, if the first groove passage 571 and the second groove passage 572 were connected to each other, the dynamic pressure of fuel gas flowing through the groove passages 571, 572 would be equalized at the connected sections. It thus would be difficult to adjust the pressure loss of fuel gas by differentiating the amplitude A between the first groove passage 571 and the second groove passage 572. However, the first groove passages 571 and the second groove passages 572 are independent from each other in the above-described configuration. Accordingly, it is easy to adjust the pressure loss of fuel gas in the first groove passage 571 and the second groove passage 572.

<Modifications>

The fifth and sixth embodiments may be modified as follows. The fifth and sixth embodiments and the following modifications can be combined as long as the combined modifications remain technically consistent with each other.

The shapes of the inlet holes 591, 593, 595 and the outlet holes 592, 594, 596 are not limited to a rectangular shape in plan view as in the fifth and sixth embodiments. For example, the shapes of the inlet holes 591, 593, 595 and the outlet holes 592, 594, 596 may be square or stadium-shaped in plan view.

The flows of the reactant gas through the holes 591, 592, 593, 594, 595, 596 are not limited to those described in the fifth and sixth embodiments. For example, the hole 596 may be used as an outlet hole for oxidant gas, and the hole 595 may be used as an outlet hole for the oxidant gas. Accordingly, the hole 594 may be used as an inlet hole for cooling medium, and the hole 593 may be used as the outlet hole for the cooling medium. That is, the oxidant gas that flows through the groove passages 547 and the cooling medium that flows through the groove passages 538, 548 may flow in the same direction as the fuel gas flowing through the groove passages 537.

The number of the groove passages 537 is not limited to six as described in the fifth and sixth embodiments, but may be less than or greater than six.

The width, that is, the cross-sectional flow area of each groove passage 537 does not necessarily need to be constant over the entire groove passage 537 in the extending direction, as long as the operation and the advantages of the present disclosure are achieved.

The groove passages 537 do not necessarily need to be configured such that the outer side groove passage 537A includes sections that are located outside the outer edge of the contact surface 530a in the third direction Z as described in the fifth and sixth embodiments. For example, the outer side groove passage 537A may be located at the same position as or on the inner side of the outer edge of the contact surface 530a in the third direction Z.

The groove passages 537 do not necessarily need to include the first groove passages 571 and the second groove passages 572, which are arranged side by side alternately in the third direction Z, as described in the fifth and sixth embodiments. For example, the groove passages 537 may include one first groove passage 571 and one second groove passage 572.

The first groove passages 571 and the second groove passages 572 do not necessarily need to be independent from each other as described in the fifth and sixth embodiments. For example, the first groove passage 571 and the second groove passage 572 may be connected to each other by another groove passage that extends in the third direction Z.

The shape of the wavy section 574 of the second groove passage 572 in the fifth embodiment may be changed in the following manner. The amplitude A, the wavelength λ, and the wavenumber of the wavy section 574 may be changed as long as the wavelength λ of a part adjacent to the first part 573a is smaller than the wavelength λ of the first part 573a, and the wavelength λ of a part adjacent to the second part 573b is larger than the wavelength λ of the second part 573b.

The shape of the wavy section 573 of the first groove passage 571 in the fifth embodiment may be changed in the following manner. The amplitude A of each wavy section 573 does not necessarily need to be constant over the entire wavy section 573 in the extending direction. Also, the wavelength λ of each wavy section 573 may be constant over the entire wavy section 573 in the extending direction. The wavenumber of the wavy section 573 is not limited to the number described in the fifth embodiment, but may be changed. These modifications are possible as long as the wavelength λ of a predetermined section in the wavy section 573 of the first groove passage 571 is different from the wavelength λ of a section in the wavy section 574 of the second groove passage 572 that is adjacent to the predetermined section.

The shape of the wavy section 576 of the second groove passage 572 in the sixth embodiment may be changed in the following manner. The amplitude A, the wavelength λ, and the wavenumber of the wavy section 576 may be changed as long as the amplitude A of a part adjacent to the first part 575a is smaller than the amplitude A of the first part 575a, and the amplitude A of a part adjacent to the second part 575b is larger than the amplitude A of the second part 575b.

The shape of the wavy section 575 of the first groove passage 571 in the sixth embodiment may be changed in the following manner. The amplitude A of each wavy section 575 may be constant over the entire wavy section 575 in the extending direction. Also, the wavelength λ of each wavy section 575 does not necessarily need to be constant over the entire wavy section 575 in the extending direction. The number of the wavy sections 575 is not limited to four as described in the sixth embodiment, but may be less than or greater than four. These modifications are possible as long as the amplitude A of a predetermined section in the wavy section 575 of the first groove passage 571 is different from the amplitude A of a section in the wavy section 576 of the second groove passage 572 that is adjacent to the predetermined section.

The separator for a fuel cell according to the present disclosure is not limited to the separator 530, which is joined to the side of the MEA 510 that corresponds to the anode 511B as described in the fifth and sixth embodiments, but may be employed in the separator 540, which is joined to the side corresponding to the cathode 511A.

The separators 530, 540 do not necessarily need to be formed by pressing a metal member, but may be formed by cutting or etching.

The material for the separators 530, 540 are not limited to titanium or stainless steel, but may be aluminum or carbon.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A separator for a fuel cell, comprising:
a contact surface configured to contact a power generating unit of the fuel cell; and
groove passages arranged side by side in the contact surface, reactant gas flowing through the groove passages, wherein
a direction in which the groove passages are arranged side by side is defined as an arrangement direction, wherein
the grooves passages extend such that entireties of the groove passages are oriented obliquely with respect to the arrangement direction,
wherein
the groove passages include an outer side groove passage that is located at an outermost position in, and
the outer side groove passage includes a section that is located at a same position as or on an outer side of an outermost edge of the contact surface in the arrangement direction; and
the groove passages include a first groove passage and a second groove passage that extend in wavy shapes in planar directions of the contact surface and are adjacent to each other in the arrangement direction,
at least one of the first groove passage and the second groove passage includes branched passages that are arranged side by side in the arrangement direction,
a number of passages arranged side by side in the arrangement direction in the first groove passage is defined as a first passage count,
a number of passages arranged side by side in the arrangement direction in the second groove passage is defined as a second passage count, and
the first passage count of a predetermined section in the first groove passage is different from the second passage count of a section in the second groove passage that is adjacent to the predetermined section.

2. The separator for the fuel cell according to claim 1, wherein
the first groove passage and the second groove passage both include the branched passages, which are arranged side by side in the arrangement direction,
the first groove passage includes a first part and a second part of which the first passage count is less than the first passage count of the first part, in the second groove passage, the second passage count of a section adjacent to the first part is less than the first passage count of the first part, and
in the second groove passage, the second passage count of a section adjacent to the second part is more than the first passage count of the second part.

3. The separator for the fuel cell according to claim 1, wherein an interval between the branched passages in the arrangement direction is smaller than an interval between the first groove passage and the second groove passage.

4. The separator for the fuel cell according to claim 1, wherein the first groove passage and the second groove passage are independent from each other.

5. The separator for the fuel cell according to claim 1, wherein the first groove passage and the second groove passage are arranged alternately in the arrangement direction.

6. A separator for a fuel cell, comprising:
a contact surface configured to contact a power generating unit of the fuel cell; and
groove passages arranged side by side in the contact surface, reactant gas flowing through the groove passages, wherein
an upstream portion and a downstream portion in a flow direction of the reactant gas in each groove passage are defined as an upstream portion and a downstream portion, respectively,
the groove passages each includes a wavy section that extends in a wavy shape in planar directions of the contact surface,
and
the wavy section includes tributary passages and a merging portion at which the tributary passages merge from an upstream side toward a downstream side,
wherein the merging portion of each wavy section includes multiple merging portions, and
wherein spacing between amplitudes in respective wavy sections of adjacent groove passages continuously increase from an upstream side to the downstream side.

7. The separator for the fuel cell according to claim 6, wherein an amplitude of the wavy section is larger in the downstream portion than in the upstream portion.

8. The separator for the fuel cell according to claim 6, wherein, in the wavy section, the tributary passages, which merge at the merging portion, are independent from each other at positions other than the merging portion.

9. The separator for the fuel cell according to claim 6, wherein
the groove passages include an outer side groove passage that is located at an outermost position in an arrangement direction in which the groove passages are arranged side by side, and
the outer side groove passage includes a section that is located at a same position as or on an outer side of an outer edge of the contact surface in the arrangement direction.

10. A separator for a fuel cell, comprising:
a contact surface configured to contact a power generating unit of the fuel cell; and
groove passages arranged adjacently in the contact surface, reactant gas flowing through the groove passages, wherein
a direction in which the groove passages are arranged side by side is defined as an arrangement direction,
the groove passages include a first groove passage and a second groove passage that extend in wavy shapes in planar directions of the contact surface and are adjacent to each other in the arrangement direction, and a wavelength of a predetermined section in the first groove passage is different from a wavelength of a section in the second groove passage that is adjacent to the predetermined section, and wherein spacing between adjacent groove passages continuously changes from an upstream most side of the wavy section to a downstream most side of the wavy section.

11. The separator for the fuel cell according to claim 10, wherein the first groove passage includes a first part and a second part of which the wavelength is smaller than the wavelength of the first part, the wavelength of a part of the second groove passage that is adjacent to the first part is smaller than the wavelength of the first part, and the wavelength of a part of the second groove passage that is adjacent to the second part is larger than the wavelength of the second part.

12. The separator for the fuel cell according to claim 10, wherein the first groove passage and the second groove passage are independent from each other.

13. The separator for the fuel cell according to claim 10, wherein the first groove passage and the second groove passage are arranged alternately in the arrangement direction.

14. The separator for the fuel cell according to claim 10, wherein the groove passages include an outer side groove passage that is located at an outermost position in the arrangement direction, and the outer side groove passage includes a section that is located at a same position as or on an outer side of an outer edge of the contact surface in the arrangement direction.

15. A separator for a fuel cell, comprising:

a contact surface configured to contact a power generating unit of the fuel cell; and groove passages arranged side by side in the contact surface, reactant gas flowing through the groove passages, wherein a direction in which the groove passages are arranged side by side is defined as an arrangement direction, the groove passages include a first groove passage and a second groove passage that extend in wavy shapes in planar directions of the contact surface and are adjacent to each other in the arrangement direction, an amplitude of a predetermined section in the first groove passage is different from an amplitude of a section in the second groove passage that is adjacent to the predetermined section, wherein the first groove passage includes a first part and a second part of which the amplitude is smaller than the amplitude of the first part, the amplitude of a part of the second groove passage that is adjacent to the first part is smaller than the amplitude of the first part, and the amplitude of a part of the second groove passage that is adjacent to the second part is larger than the amplitude of the second part, and wherein a wavelength of the wavy shapes in a same one of the groove passages is the same.

16. The separator for the fuel cell according to claim 15, wherein the first groove passage and the second groove passage are independent from each other.

17. The separator for the fuel cell according to claim 15, wherein the first groove passage and the second groove passage are arranged alternately in the arrangement direction.

18. The separator for the fuel cell according to claim 15, wherein the groove passages include an outer side groove passage that is located at an outermost position in the arrangement direction, and the outer side groove passage includes a section that is located at a same position as or on an outer side of an outer edge of the contact surface in the arrangement direction.

* * * * *